US009598635B2

United States Patent
Mattoussi et al.

(10) Patent No.: US 9,598,635 B2
(45) Date of Patent: Mar. 21, 2017

(54) PHOTO-INDUCED PHASE TRANSFER OF LUMINESCENT QUANTUM DOTS

(71) Applicant: The Florida State University Research Foundation, Inc., Tallahassee, FL (US)

(72) Inventors: Hedi Mattoussi, Tallahassee, FL (US); Igor Alabugin, Tallahassee, FL (US); Goutam Palui, Tallahassee, FL (US); Tommaso Avellini, Bologna (IT)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 942 days.

(21) Appl. No.: 13/888,488

(22) Filed: May 7, 2013

(65) Prior Publication Data

US 2013/0299745 A1 Nov. 14, 2013

Related U.S. Application Data

(60) Provisional application No. 61/644,757, filed on May 9, 2012.

(51) Int. Cl.
*C09K 11/02* (2006.01)
*B82Y 40/00* (2011.01)

(52) U.S. Cl.
CPC ............. *C09K 11/025* (2013.01); *B82Y 40/00* (2013.01); *Y10S 977/774* (2013.01); *Y10S 977/892* (2013.01); *Y10S 977/95* (2013.01)

(58) Field of Classification Search
CPC .... C09K 11/025; B82Y 40/00; Y10S 977/774

USPC ...................... 252/301.36; 977/774
See application file for complete search history.

(56) References Cited

U.S. PATENT DOCUMENTS

2011/0306079 A1* 12/2011 Tulsky .................... B01J 13/14
435/29

OTHER PUBLICATIONS

Tamang et al., "Aqueous Phase Transfer of InP/ZnS and High Colloidal Stability", Oct. 28, 2011, ACS Nano, vol. 5, No. 12, pp. 9392-9402.*
Jiang et al., "Complete reversible phase transfer of luminescent CdTe nanocrystals", Nov. 23, 2007, J. Mater. Chem., 18, pp. 344-349.*
Muro et al., "Small and Stable Sulfobetaine Zwitterionic Quantum Dots for Functional Live-Cell Imaging" , 2010, J. Am. Chem. Soc., 132, pp. 4556-4557.*
Susumu et al., "Multifunctional ligands based on dihydrolipoic acid and polyethylene glycol to promote biocompatibility of quantum dots", Mar. 5, 2009, Nature Protocols, vol. 4, No. 3, pp. 424-436.*

(Continued)

*Primary Examiner* — Matthew E Hoban
*Assistant Examiner* — Lynne Edmondson
(74) *Attorney, Agent, or Firm* — Armstrong Teasdale LLP

(57) ABSTRACT

A method for the photo-mediated phase transfer of inorganic nanocrystals, such as luminescent quantum dots, QDs, is provided. Irradiation, specifically UV excitation ($\lambda_{ex} < 400$ nm), promotes the in-situ ligand exchange of hydrophobic quantum dots with hydrophilic ligands and their facile transfer to polar solvents and buffer media. The technique enables transfer of quantum dots and other nanocrystal materials from hydrophobic to polar and hydrophilic solutions.

18 Claims, 14 Drawing Sheets

(56) References Cited

OTHER PUBLICATIONS

Alivisatos, A.P., Semiconductor Clusters, Nanocrystals, and Quantum Dots, Science; Feb. 16, 1996, vol. 271, No. 5251; ProQuest; pp. 933-937.

Murray, C. B., et al., Synthesis and Characterization of Monodisperse Nanocrystals and Close-Packed Nanocrystal Assemblies, Annu. Rev. Mater. Sci, 2000, vol. 30 pp. 545-610.

Klimov, V.I. et al., Optical Gain and Stimulated Emission in Nanocrystal Quantum Dots, Science, Oct. 13, 2000, vol. 290, No. 5490; ProQuest, pp. 314-317.

Malko, A.V. et al., From amplified spontaneous emission to microring lasing using nanocrystal quantum dots solids, Applied Physcis Letters, Aug. 12, 2002, vol. 81, No. 7, pp. 1303-1305.

Nozik, A. J. et al., Semiconductor Quantum Dots and Quantum Dot Arrays and Applications of Multiple Exciton Generation to Third-Generation Photovoltaic Solar Cells, Chem. Rev., 2010, vol. 110, pp. 6873-6890.

Li Ling et al., Highly Efficient CdS Quantum Dot-Sensitized Solar Cells Based on a Modified Polysulfide Electrolyte, Journal of the American Chemical Society, 2011, vol. 133, pp. 8458-8460.

Raymo, Francisco M., et al., Luminescent chemosensors based on semiconductor quantum dots, Physical Chemistry Chemical Physics, Feb. 1, 2007, vol. 9, pp. 2036-2043.

Medintz, Igor L., et al., Quantum dot bioconjugates for imaging labelling and sensing, Nature Materials, Jun. 2005, vol. 4, pp. 435-446.

Michalet, X. et al., Quantum Dots for Live Cells, in Vivo Imaging, and Diagnostics, Science, Jan. 28, 2005, vol. 307, pp. 538-544.

Biju, Vasudevanpillai et al., Delivering quantum dots to cells: bioconjugated quantum dots for targeted and nonspecific extracellular and intracellular imaging, Chemical Society Reviews, May 27, 2010, vol. 39, pp. 3031-3056.

Zrazhevskiy, Paul et al., Designing multifunctional quantum dots for bioimaging, detection, and drug delivery, Chemical Society Reviews, Dec. 23, 2009, vol. 39, pp. 4326-4354.

Pinaud, Fabien et al., Probing cellular events, one quantum dot at a time, Nature Methods, Apr. 2010, vol. 7, No. 4, pp. 275-285.

Jaiswal, Jyoti K. et al., Long-term multiple color imaging of live cells using quantum dot bioconjugates, Nature Biotechnology, Jan. 2003, vol. 21, pp. 47-51.

Gao, Xiaohu, et al., In vivo cancer targeting and imaging with semiconductor quantum dots, Nature Biotechnology, Aug. 2004, vol. 22, No. 8, pp. 969-976.

Rossetti, R. et al., Size effects in the excited electronic states of small colloidal CdS crystallites, Journal of Chemical Physics, 1984, vol. 80, pp. 4464-4469.

Murray, C. B. et al., Synthesis and Characterization of Nearly Monodisperse CdE (E = S, Se, Te) Semiconductor Nanocrystallites, American Chemical Socity, 1993, vol. 115, pp. 8706-8715.

Dabbousi, B. O. et al., (CdSe)Zns Core-Shell Quantum Dots: Synthesis and Characterization of a Size Series of Highly Luminescent Nanocrystallites, 1997, vol. 101, pp. 9463-9475.

Liu, Wenhao et al., Compact Biocompatible Quantum Dots Functionalized for Cellular Imaging, Journal of American Chemical Society, 2008, vol. 130, pp. 1274-1284.

Susumu, Kimihiro et al., Multifunctional ligands based on dihydrolipoic acid and polyethylene glycol to promote biocompatibility of quantum dots, Nature Protocols, 2009, vol. 4, No. 3, pp. 424-436.

Jung, Jongjin et al., Selective Inhibition of Human Tumor Cells through Multifunctional Quantum-Dot-Based siRNA Delivery**, Angew. Chem. Inc. Ed., 2010, vol. 49, pp. 103-107.

Liu, Wenhao et al., Compact Biocompatible Quantum Dots via RAFT-Mediated Synthesis of Imidazole-Based Random Copolymer Lignad, American Chemical Society, 2010, vol. 132, pp. 472-483.

Lee, Jae-Hyun et al., Artificially engineered magnetic nanoparticles for ultra-sensitive molecular imaging, Jan. 2007, vol. 13, No. 1, pp. 95-99.

Stewart, Michael H. et al., Multidentate Poly(ethylene glycol) Ligands Provide Colloidal Stability to Semiconductor and Metallic Nanocrystals in Extreme Conditions, Journal of American Chemical Society, 2010, vol. 132, pp. 9804-9813.

Muro, Eleonora et al., Small and Stable Sulfobetaine Zwitterionic Quantum Dots for Functional Live-Cell Imaging, Journal of American Chemical Society, 2010, vol. 132, pp. 4556-4557.

Lees, Emma E. et al., Experimental Determination of Quantum Dot Size Distributions, Ligand Packing Densities, an Bioconjugation Using Analytical Ultracentrifugation, American Chemical Society, 2008, vol. 8, No. 9, pp. 2883-2890.

Liu, Lu et al., Bifunctional Multidentate Ligand Modified Highly Stable Water-Soluble Quantum Dots, Inorganic Chemistry, American Chemical Society, 2010, vol. 49, pp. 3768-3775.

Clapp, Aaron R. et al., Capping of CdSe—ZnS quantum dots with DHLA and subsequent conjugation with proteins, Nature Protocols, 2006, vol. 1, No. 3, pp. 1258-1266.

Qu, Lianhua et al., Alternative Routes toward High Quality CdSe Nanocrystals, American Chemical Society, 2001, vol. 1, No. 6, pp. 333-337.

Mei, Bing C., Modular poly(ethylene glycol) ligands for biocompatible semiconductor and gold nanocrystals with extended pH and ionic stability, J. Mater. Chem., 2008, vol. 18, pp. 4949-4958.

Uyeda, Tetsuo H. et al., Synthesis of Compact Multidentate Ligands to Prepare Stable Hydrophilic Quantum Dot Fluorophores, Journal of American Chemical Society, 2005, vol. 127, pp. 3870-3878.

Choi, Chung Hang J., et al., Mechanism of active targeting in solid tumors with transferrin-containing gold nanoparticles, PNAS, Jan. 19, 2010, vol. 107, No. 3, 1235-1240.

Clapp, Aaron R. et al., Fluorescence Resonance Energy Transfer Between Quantum Dot Donors, Journal of American Chemical Society, 2004, vol. 126, pp. 301-310.

Medintz, Igor L., et al., Proteolytic activity monitored by fluorescence resonance energy transfer through quantum-dot-peptide conjugates, Nature Materials, Jul. 2006, vol. 5, pp. 581-589.

Chen, Chun-Yen et al., Potassium ion recognition by 15-crown-5 functionalized CdSe/ZnS quantum dots in H2O, Chem. Commun, 2006, pp. 263-265.

Susumu, Kimihiro et al., Colloidal Quantum Dots: Synthesis, Photophysical Properties, and Biofunctionalization Strategies, Atrech House, Aug. 25, 2008, pp. 1-26.

Hines, Margaret A., et al., Synthesis and Characterization of Strongly Luminescing ZnS-Capped CdSe Nanocrystals, J. Phys. Chem, American Chemical Society, 1996, vol. 100, No. 2, pp. 468-471.

van Embden, Joel et al., Mapping the Optical Properties of CdSe/CdS Heterostructure Nanocrystals: The Effects of Core Size and Shell Thickness, Journal of American Chemical Society, 2009, vol. 131, pp. 14299-14309.

Gerion, Daniele, et al., Synthesis and Properties of Biocompatible Water-Soluble Silica-Coated CdSe/ZnS Semicondutor Quantum Dots, J. Phys. Chem. B, 2001, vol. 105, pp. 8861-8871.

Bhang, Suk Ho et al., Hyaluronic Acid-Quantum Dot Conjugates for In Vivo Lymphatic Vessel Imaging, American Chemical Society, May 28, 2009, vol. 3, No. 6, pp. 1389-1398.

Yildiz, Ibrahim et al., Biocompatible CdSe—ZnS Core-Shell Quantum Dots Coated with Hydrophilic Polythiols, American Chemical Society, 2009, vol. 25, No. 12, pp. 7090-7096.

Yildiz, Ibrahim et al., Biocompatible CdSe—ZnS Core-Shell Quantum Dots with Reactive Function Groups on Their Surface, Langmuir, 2010, vol. 26, No. 13, pp. 11503-11511.

Shen, Hongyan et al., Poly(ethylene glycol) Carbondiimide Coupling Reagents for the Biological and Chemical Functionalization of Water-Soluble Nanoparticles, American Chemical Society, 2009, vol. 3, No. 4, pp. 915-923.

Anderson, Robin E. et al., Systematic Investigation of Preparing Biocompatible, Single, and Small ZnS-Capped CdSe Quantum Dots with Amphiphilic Polymers, American Chemical Society, 2008, vol. 2, No. 7, pp. 1341-1352.

Bullen, C. et al., The Effects of Chemisorption on the Luminescence of CdSe Quantum Dots, Langmuir, 2006, vol. 22, pp. 3007-3013.

(56) References Cited

OTHER PUBLICATIONS

Munro, Andrea M. et al., Quantitative Study of the Effects of Surface Ligand Concentration on CdSe Nanocrystal Photoluminescence, J. Phys. Chem. C, 2007, vol. 111, pp. 6220-6227.

Mei, Bing C. et al., Effects of Ligand Coordination Number and Surface Curvature on the Stability of Gold Nanoparticles in Aqueous Solutions, Langmuir, American Chemical Society, 2009, vol. 25, No. 18, pp. 10604-10611.

Na, Hyon Bin et al., Multidentate Catechol-Based Polyethylene Glycol Oligomers Provide Enhanced Stability and Biocompatibility to Iron Oxide Nanoparticles, American Chemical Society, 2012, vol. 6, No. 1, pp. 389-399.

Yu, William W. et al., Forming Biocompatible and Nanaggregated Nanocrystals in Water Using Amphiphilic Polymers, Article, Feb. 20, 2007, pp. 2871-2879, vol. 129, J. Am. Chem. Soc.

Palui, Goutam et al., Poly(ethylene glycol)-Based Multidentate Oligomers for Biocompatible Semiconductor and Gold Nanocrystals, Article, 2011, pp. 2761-2772, vol. 28, Langmuir, American Chemical Society.

Pellegrino, Teresa et al., Hydrophobic Nanocrystals Coated with an Amphiphilic Polymer Shell: A General Route to Water Soluble Nanocrystals, NANO letters, 2004, pp. 703-707, vol. 4, No. 4, American Chemical Society.

\* cited by examiner

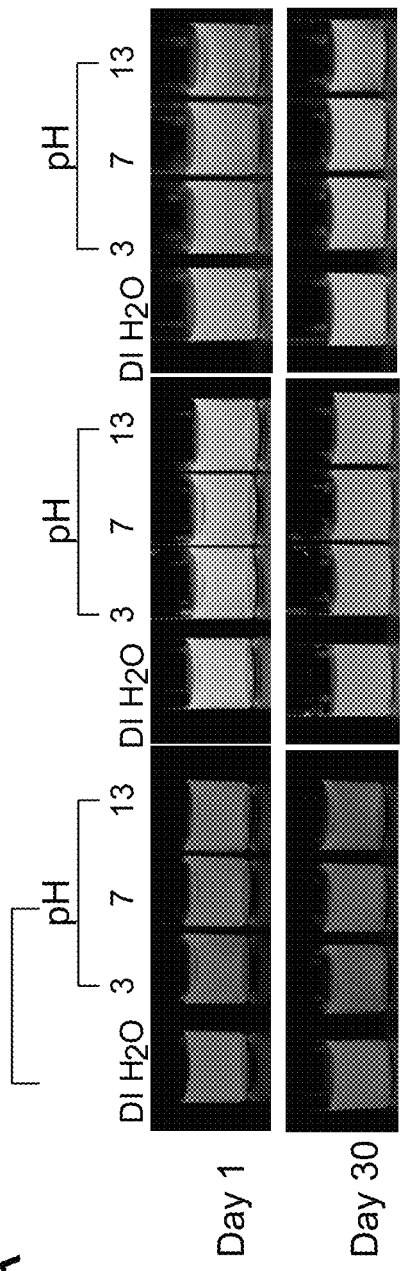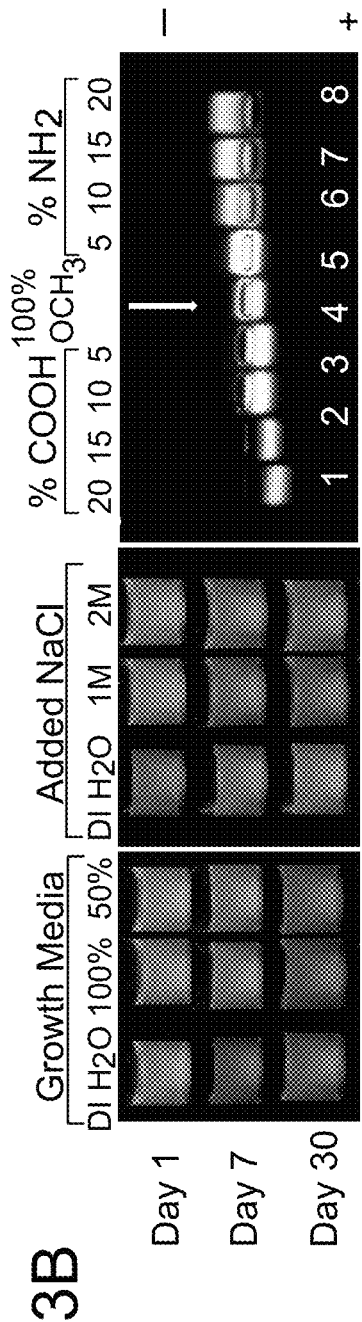
FIG. 3A
FIG. 3B

PHOTO-INDUCED PHASE TRANSFER OF LUMINESCENT QUANTUM DOTS

CROSS REFERENCE TO RELATED APPLICATIONS

This application claims priority from U.S. Provisional Application Ser. No. 61/644,757, filed May 9, 2012, the disclosure of which is incorporated herein as if set forth in its entirety.

STATEMENT REGARDING FEDERALLY SPONSORED RESEARCH

This invention was made with government support under Grant Nos. CHE 1058957 and CHE 0848686 awarded by the National Science Foundation. The government has certain rights in the invention.

FIELD OF THE INVENTION

The present invention is directed to methods of preparing nanoparticles such as nanocrystals, and more particularly to the preparation of nanoparticles such as nanocrystals in immiscible solvents, e.g., biphasic systems comprising non-polar solvents and polar solvents, and even more particularly to methods of photo-induced phase transfer of nanoparticles such as nanocrystals from one solvent to another, wherein each solvent is immiscible in the other.

BACKGROUND OF THE INVENTION

Fluorescent semiconductor nanoparticles (quantum dots, QDs) exhibit several unique optical and spectroscopic properties that are not observed in their bulk parent materials or at the molecular scale. See References 1-5. Quantum dots made of CdSe, CdS, InAs, and InP cores have tunable size-dependent broad absorption, with high extinction coefficient, and size-dependent narrow Gaussian emission profiles. See References 4, 6, and 7. CdSe-based nanoparticles, in particular, exhibit remarkable resistance to chemical and photo-degradation and a high two-photon action cross-section. See References 8-11. For a wide range of bio-inspired applications, the optical and spectroscopic properties exhibited by luminescent QDs are unmatched by organic dyes and fluorescent proteins, which has spurred significant interest in developing QDs as fluorescent platforms and markers to increase our understanding of a variety of biological processes, ranging from sensing to the tracking of intracellular protein movements and interactions. See References 8 and 10-19. An important requirement for the effective integration into biotechnology is, however, the ability to access stable, water-soluble reagents that can be manipulated under a wide variety of conditions (basic and acidic pHs, high concentrations of electrolytes and in the presence of reducing agents) and chemistries; the latter should allow straightforward and controllable coupling to biomolecules such as proteins, peptides and nucleic acid oligomers. See References 10, 11, 15, 19, and 20.

Highly luminescent quantum dots are reproducibly prepared with narrow size distribution and high fluorescence quantum yields by reacting organometallic precursors at high temperature in coordinating solutions. See References 3, 4, 6, and 21-28. These QDs are typically capped with hydrophobic molecules (trioctyl phosphine (TOP), trioctyl phosphine oxide (TOPO), and alkylamines) and are dispersed in non-polar organic solvents. Post-synthetic surface modifications are thus required to render them hydrophilic and biocompatible. An established strategy for preparing water-soluble QDs relies on replacing the native hydrophobic cap with bifunctional hydrophilic ligands that combine metal-chelating anchors onto the nanocrystal surfaces and hydrophilic modules that promote aqueous compatibility. See References 29-35. Two inherent properties of the ligands greatly influence the stability of the hydrophilic QDs: 1) the coordination affinity of the anchoring groups to the inorganic surface; and 2) the method for achieving aqueous compatibility of the nanocrystals, i.e., whether it is driven by electrostatic repulsions between lateral charges, or results from strong ligand affinity to the surrounding buffer. See References 17 and 17-20.

Ligands presenting two and four thiol anchoring groups, such as polyethylene glycol-appended with one or two dihydrolipoic acid groups, DHLA-PEG and bis(DHLA)-PEG, have been shown to provide greatly enhanced stability over a wide range of biological conditions compared to their monothiol-ligands, while significantly reducing non-specific interactions. See References 30-32, 36, and 37. This result has been attributed to the higher coordination onto the nanocrystal surface afforded by the multi-thiols (compared to their monothiol-ligands), which essentially shifts the coordination equilibrium and decreases the dissociation rate of the ligand from the QD surfaces. See References 29-31. Enhanced Au nanoparticle stability afforded by these multidentate ligands is also well documented. See References 32, 36, and 38-42. However, reduction of the lipoic acid (LA) groups to DHLAs is required for effective capping of QDs. See References 29, 36, and 43. To date, the requisite reduced form of lipoic acid used for the phase transfer has been prepared via prior chemical reduction of the dithiolane ring under strong reducing conditions using $NaBH_4$. See References 37 and 44. Alternative reduction route relying on electrochemical methods has been reported. See References 45 and 46. While effective, this process imposes limitations with respect to tolerating other functional groups on the LA-based ligands and introduces an extra processing step with specific requirements. For instance, we found that $NaBH_4$-reduction can alter the integrity of certain functional groups such as the terminal azide on LA-PEG-$N_3$. This route also requires careful storage of the reduced DHLA-based ligands under inert atmosphere to avoid re-oxidation of the dithiol back to a disulfide. See References 29, 30, and 44.

A previous study by Sander and co-workers reports that the cyclic disulfide core of lipoic acid has a well defined absorption at ~350 nm and excitation at this wavelength produces a relatively long-lived ($\tau$~0.1 µs) triplet state, which can be converted into DHLA. See Reference 47. The reported yields for this process were moderate (up to ~25%).

REFERENCES (1) Brus, L. *J Phys Chem-Us* 1986, 90, 2555.
(2) Alivisatos, A. P. *Science* 1996, 271, 933.
(3) Murray, C. B.; Kagan, C. R.; Bawendi, M. G. *Annu Rev Mater Sci* 2000, 30, 545.
(4) Talapin, D. V.; Lee, J. S.; Kovalenko, M. V.; Shevchenko, E. V. *Chem Rev* 2010, 110, 389.
(5) Vanmaekelbergh, D. *Nano Today* 2011, 6, 419.
(6) Murray, C. B.; Norris, D. J.; Bawendi, M. G. *J Am Chem Soc* 1993, 115, 8706.
(7) Guzelian, A. A.; Banin, U.; Kadavanich, A. V.; Peng, X.; Alivisatos, A. P. *Appl Phys Lett* 1996, 69, 1432.

(8) Larson, D. R.; Zipfel, W. R.; Williams, R. M.; Clark, S. W.; Bruchez, M. P.; Wise, F. W.; Webb, W. W. *Science* 2003, 300, 1434.
(9) Clapp, A. R.; Pons, T.; Medintz, I. L.; Delehanty, J. B.; Melinger, J. S.; Tiefenbrunn, T.; Dawson, P. E.; Fisher, B. R.; O'Rourke, B.; Mattoussi, H. *Adv Mater* 2007, 19, 1921.
(10) Jaiswal, J. K.; Mattoussi, H.; Mauro, J. M.; Simon, S. M. *Nat Biotechnol* 2003, 21, 47.
(11) Wu, X. Y.; Liu, H. J.; Liu, J. Q.; Haley, K. N.; Treadway, J. A.; Larson, J. P.; Ge, N. F.; Peale, F.; Bruchez, M. P. *Nat Biotechnol* 2003, 21, 41.
(12) Bruchez, M.; Moronne, M.; Gin, P.; Weiss, S.; Alivisatos, A. P. *Science* 1998, 281, 2013.
(13) Chan, W. C. W.; Nie, S. M. *Science* 1998, 281, 2016.
(14) Alivisatos, P. *Nat Biotechnol* 2004, 22, 47.
(15) Medintz, I. L.; Uyeda, H. T.; Goldman, E. R.; Mattoussi, H. *Nat Mater* 2005, 4, 435.
(16) Biju, V.; Itoh, T.; Ishikawa, M. *Chem Soc Rev* 2010, 39, 3031.
(17) Zrazhevskiy, P.; Sena, M.; Gao, X. H. *Chem Soc Rev* 2010, 39, 4326.
(18) Sperling, R. A.; Parak, W. J. *Philos T R Soc A* 2010, 368, 1333.
(19) Michalet, X.; Pinaud, F. F.; Bentolila, L. A.; Tsay, J. M.; Doose, S.; Li, J. J.; Sundaresan, G.; Wu, A. M.; Gambhir, S. S.; Weiss, S. *Science* 2005, 307, 538.
(20) Mattoussi, H.; Palui, G.; Na, H. B. *Adv Drug Deliv Rev* 2012, 64, 138.
(21) Peng, X. G.; Schlamp, M. C.; Kadavanich, A. V.; Alivisatos, A. P. *J Am Chem Soc* 1997, 119, 7019.
(22) Dabbousi, B. O.; RodriguezViejo, J.; Mikulec, F. V.; Heine, J. R.; Mattoussi, H.; Ober, R.; Jensen, K. F.; Bawendi, M. G. *J Phys Chem B* 1997, 101, 9463.
(23) Peng, Z. A.; Peng, X. G. *J Am Chem Soc* 2001, 123, 183.
(24) Yu, W. W.; Peng, X. G. *Angew Chem Int Edit* 2002, 41, 2368.
(25) Reiss, P.; Bleuse, J.; Pron, A. *Nano Lett* 2002, 2, 781.
(26) Talapin, D. V.; Nelson, J. H.; Shevchenko, E. V.; Aloni, S.; Sadtler, B.; Alivisatos, A. P. *Nano Lett* 2007, 7, 2951.
(27) Reiss, P.; Protiere, M.; Li, L. *Small* 2009, 5, 154.
(28) Hines, M. A.; Guyot-Sionnest, P. *J Phys Chem-Us* 1996, 100, 468.
(29) Mattoussi, H.; Mauro, J. M.; Goldman, E. R.; Anderson, G. P.; Sundar, V. C.; Mikulec, F. V.; Bawendi, M. G. *J Am Chem Soc* 2000, 122, 12142.
(30) Susumu, K.; Uyeda, H. T.; Medintz, I. L.; Pons, T.; Delehanty, J. B.; Mattoussi, H. *J Am Chem Soc* 2007, 129, 13987.
(31) Liu, W.; Howarth, M.; Greytak, A. B.; Zheng, Y.; Nocera, D. G.; Ting, A. Y.; Bawendi, M. G. *J Am Chem Soc* 2008, 130, 1274.
(32) Mei, B. C.; Susumu, K.; Medintz, I. L.; Delehanty, J. B.; Mountziaris, T. J.; Mattoussi, H. *J Mater Chem* 2008, 18, 4949.
(33) Susumu, K.; Mei, B. C.; Mattoussi, H. *Nat Protoc* 2009, 4, 424.
(34) Lees, E. E.; Gunzburg, M. J.; Nguyen, T. L.; Howlett, G. J.; Rothacker, J.; Nice, E. C.; Clayton, A. H. A.; Mulvaney, P. *Nano Lett* 2008, 8, 2883.
(35) Jung, J. J.; Solanki, A.; Memoli, K. A.; Kamei, K.; Kim, H.; Drahl, M. A.; Williams, L. J.; Tseng, H. R.; Lee, K. *Angew Chem Int Edit* 2010, 49, 103.
(36) Stewart, M. H.; Susumu, K.; Mei, B. C.; Medintz, I. L.; Delehanty, J. B.; Blanco-Canosa, J. B.; Dawson, P. E.; Mattoussi, H. *Journal of the American Chemical Society* 2010, 132, 9804.
(37) Uyeda, H. T.; Medintz, I. L.; Jaiswal, J. K.; Simon, S. M.; Mattoussi, H. *J Am Chem Soc* 2005, 127, 3870.
(38) Li, Z.; Jin, R. C.; Mirkin, C. A.; Letsinger, R. L. *Nucleic Acids Research* 2002, 30, 1558.
(39) Park, J. S.; Vo, A. N.; Barriet, D.; Shon, Y. S.; Lee, T. R. *Langmuir* 2005, 21, 2902.
(40) Srisombat, L. O.; Park, J. S.; Zhang, S.; Lee, T. R. *Langmuir* 2008, 24, 7750.
(41) Zhang, S. S.; Leem, G.; Srisombat, L. O.; Lee, T. R. *Journal of the American Chemical Society* 2008, 130, 113.
(42) Mei, B. C.; Susumu, K.; Medintz, I. L.; Mattoussi, H. *Nat Protoc* 2009, 4, 412.
(43) Susumu, K.; Uyeda, H. T.; Medintz, I. L.; Mattoussi, H. *J Biomed Biotechnol* 2007.
(44) Gunsalus, I. C.; Barton, L. S.; Gruber, W. *Journal of the American Chemical Society* 1956, 78, 1763.
(45) Howie, J. K.; Houts, J. J.; Sawyer, D. T. *J Am Chem Soc* 1977, 99, 6323.
(46) Shaked, Z. e.; Barber, J. J.; Whitesides, G. M. *The Journal of Organic Chemistry* 1981, 46, 4100.
(47) Bucher, G.; Lu, C. Y.; Sander, W. *Chemphyschem* 2005, 6, 2607.
(48) McLaurin, E. J.; Greytak, A. B.; Bawendi, M. G.; Nocera, D. G. *J Am Chem Soc* 2009, 131, 12994.
(49) Yang, G.; Pan, F.; Parkhurst, C. N.; Grutzendler, J.; Gan, W. B. *Nat Protoc* 2010, 5, 201.
(50) Choi, H. S.; Liu, W.; Misra, P.; Tanaka, E.; Zimmer, J. P.; Ipe, B. I.; Bawendi, M. G.; Frangioni, J. V. *Nat Biotechnol* 2007, 25, 1165.
(51) Ji, X.; Palui, G.; Avellini, T.; Na, H. B.; Yi, C.; Knappenberger, K. L.; Mattoussi, H. *J Am Chem Soc* 2012, 134, 6006.
(52) Amelia, M.; Font, M.; Credi, A. *Dalton Transactions* 2011, 40, 12083.
(53) Park, J.; Nam, J.; Won, N.; Jin, H.; Jung, S.; Jung, S.; Cho, S. H.; Kim, S. *Adv Funct Mater* 2011, 21, 1558.
(54) Susumu, K.; Uyeda, H. T.; Medintz, I. L.; Pons, T.; Delehanty, J. B.; Mattoussi, H. J. Am. Chem. Soc. 2007, 129, 13987.
(55) Susumu, K.; Mei, B. C.; Mattoussi, H. Nat. Protoc. 2009, 4, 424.
(56) Park, J.; Nam, J.; Won, N.; Jin, H.; Jung, S.; Jung, S.; Cho, S. H.; Kim, S. *Advanced Functional Materials* 2011, 21, 1558.

BRIEF DESCRIPTION OF THE INVENTION

The present invention is directed to a method for preparing a composition comprising a polar solvent comprising a nanoparticle. The method comprises irradiating a biphasic mixture, the biphasic mixture comprising a polar solvent and a non-polar solvent, the polar solvent and the non-polar solvent being immiscible in each other. Prior to irradiation, the polar solvent comprises a hydrophilic surfactant, the hydrophilic surfactant comprising a moiety reactive with a surface of the nanoparticle or a moiety that becomes reactive with a surface of the nanoparticle during irradiation of the biphasic mixture. Additionally, prior to irradiation, the non-polar solvent comprises the nanoparticle. Additionally, irradiating the biphasic mixture induces a reaction between the nanoparticle and the reactive moiety of the hydrophilic surfactant, which reaction mediates transfer of the nanoparticle from the nonpolar solvent to the polar solvent.

The present invention is further directed to a method for preparing a composition comprising a nanoparticle in a polar solvent. The method comprises contacting a hydrophobic nanoparticle with a polar solvent to thereby prepare a reaction mixture comprising the hydrophobic nanoparticle and the polar solvent, the polar solvent comprising a hydrophilic surfactant comprising a moiety reactive with the nanoparticle surface; and irradiating the reaction mixture to thereby induce a reaction between the nanoparticle and the reactive moiety of the hydrophilic surfactant, which reaction causes the nanoparticle to be coated with the hydrophilic surfactant.

The present invention is still further directed to a nanoparticle comprising: a core; and a hydrophilic shell derived from a surfactant having the structure:

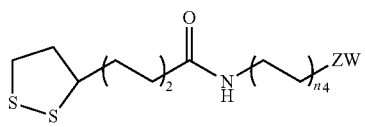

wherein $n_4$ has a value between 1 and 20 and ZW is a zwitterionic moiety.

BRIEF DESCRIPTION OF THE DRAWINGS

FIG. 3A are fluorescence images of vials containing green (left), yellow (center), and orange (right) emitting QDs dispersed in PBS buffer (at 1 μM) at varying pH along with nanocrystals dispersed in DI water (control).

FIG. 3B are fluorescence image of vials containing green emitting QDs (at 0.5 μM) dispersed in growth media and in buffer with added 1 M and 2M NaCl. Images collected from freshly prepared samples are on top, images after several weeks of storage are shown below. The vials were illuminated with a hand-held UV lamp (excitation at 365 nm).

FIG. 3B also shows a gel electrophoresis image showing surface charge modulation in QDs phase-transferred with a mixture of LA-PEG-OCH$_3$/LA-PEG-COOH or LA-PEG-OCH$_3$/LA-PEG-NH$_2$ with increasing fraction of end-terminated ligands. Lanes 1-4 and 6-9 correspond to QD presenting LA-PEG-NH$_2$ and LA-PEG-COOH, respectively. A control dispersion of QD phase transferred with LA-PEG-OCH$_3$ is shown in lane 5.

DETAILED DESCRIPTION OF THE EMBODIMENT(S) OF THE INVENTION

Figure 1A:
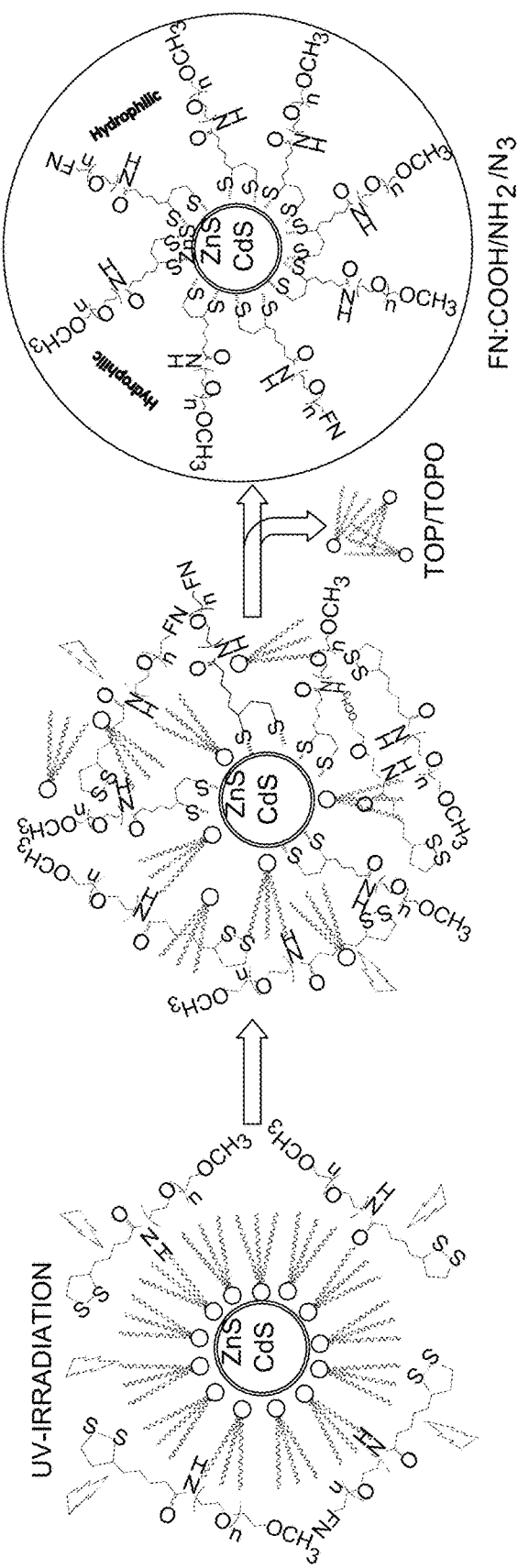
FIG. 1A is a schematic depiction of the UV-promoted phase transfer of TOP/TOPO-QDs from hexane to methanol and other polar media including water; I and III designate the initial (hydrophobic) and final (hydrophilic) sate of a QD, while II refers to an intermediate state where cap exchange is still incomplete.
Figure 1B:
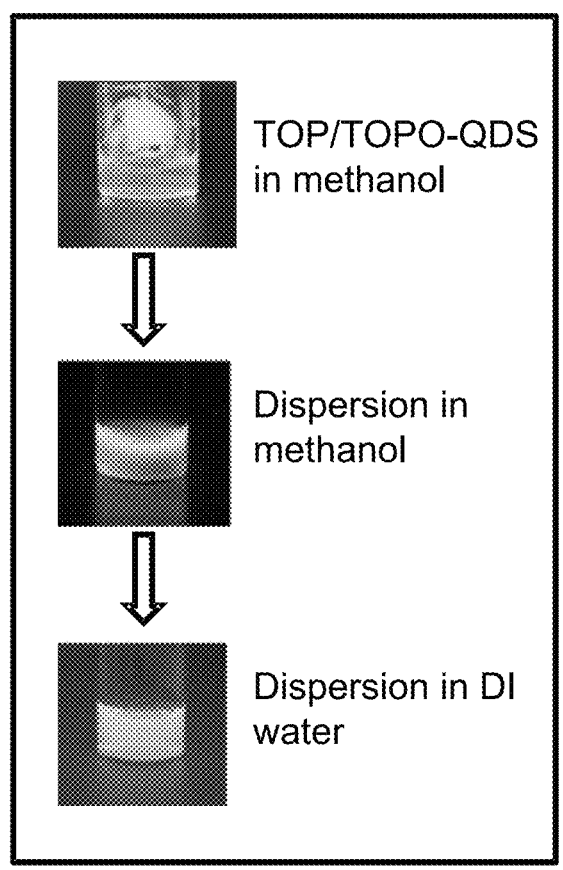
FIG. 1B is a depiction of phase transfer of quantum dots. The top vial shows QDs as wet paste (precipitated from hexane) mixed with methanol containing LA-PEG-OCH$_3$; the system is heterogeneous. The middle and bottom vials show the dispersal of the same QDs upon UV-irradiation in methanol and their subsequent transfer to DI water.
Figure 1C:
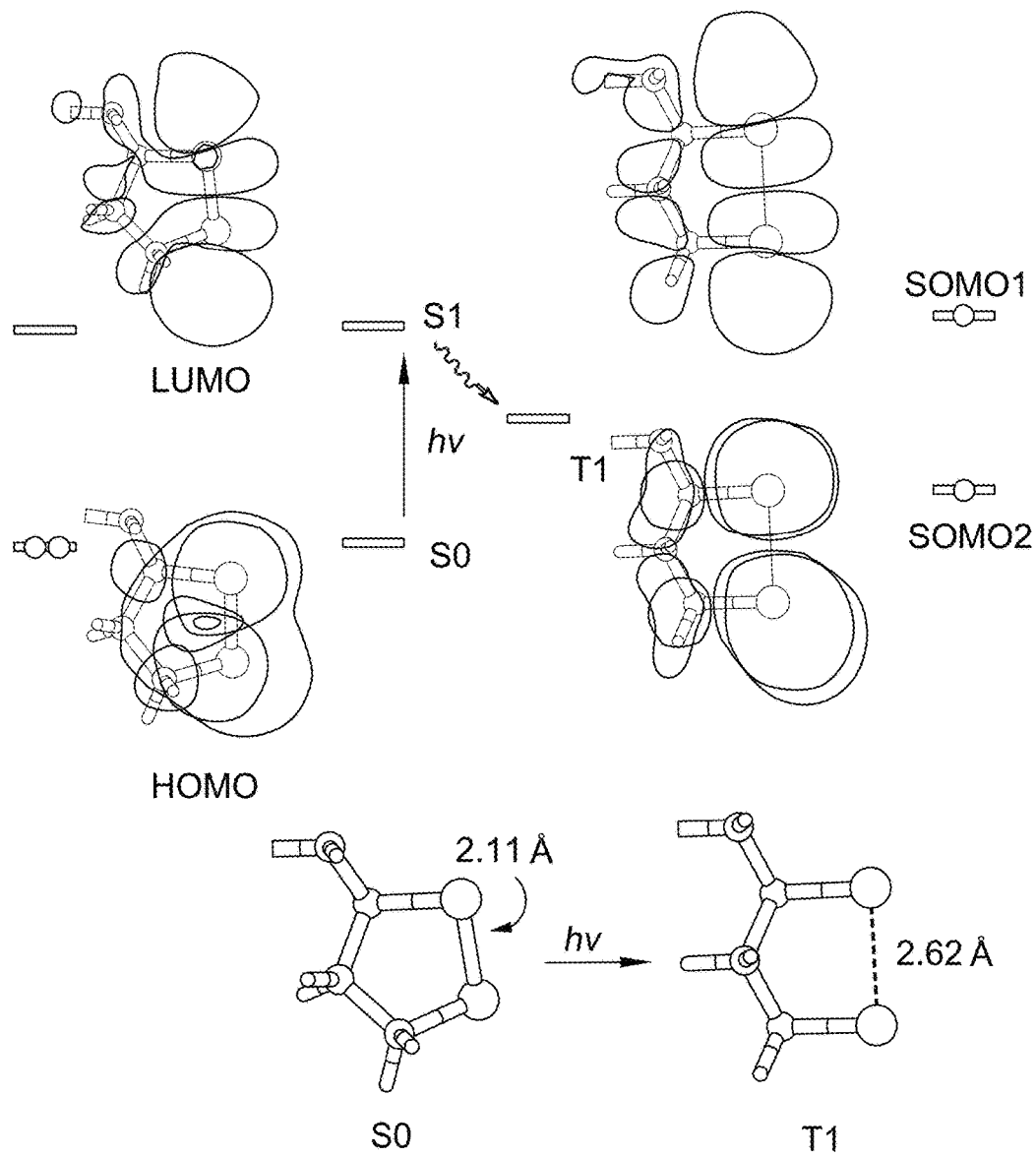
FIG. 1C depicts the photochemical excitation of 3-alkyl-1,2-dithiacyclopentanes corresponds to the one-electron transfer from the Highest Occupied Molecular Orbital (HOMO) to the Lowest Unoccupied Molecular Orbital (LUMO). Subsequent Inter-System Crossing (ISC) transforms the initially formed S1 state into the triplet state (T1) with the partially broken S . . . S bond. Molecular geometry and electronic structure were analyzed at the B3LYP/6-31+G(d,p) level of theory.
Figure 1D:
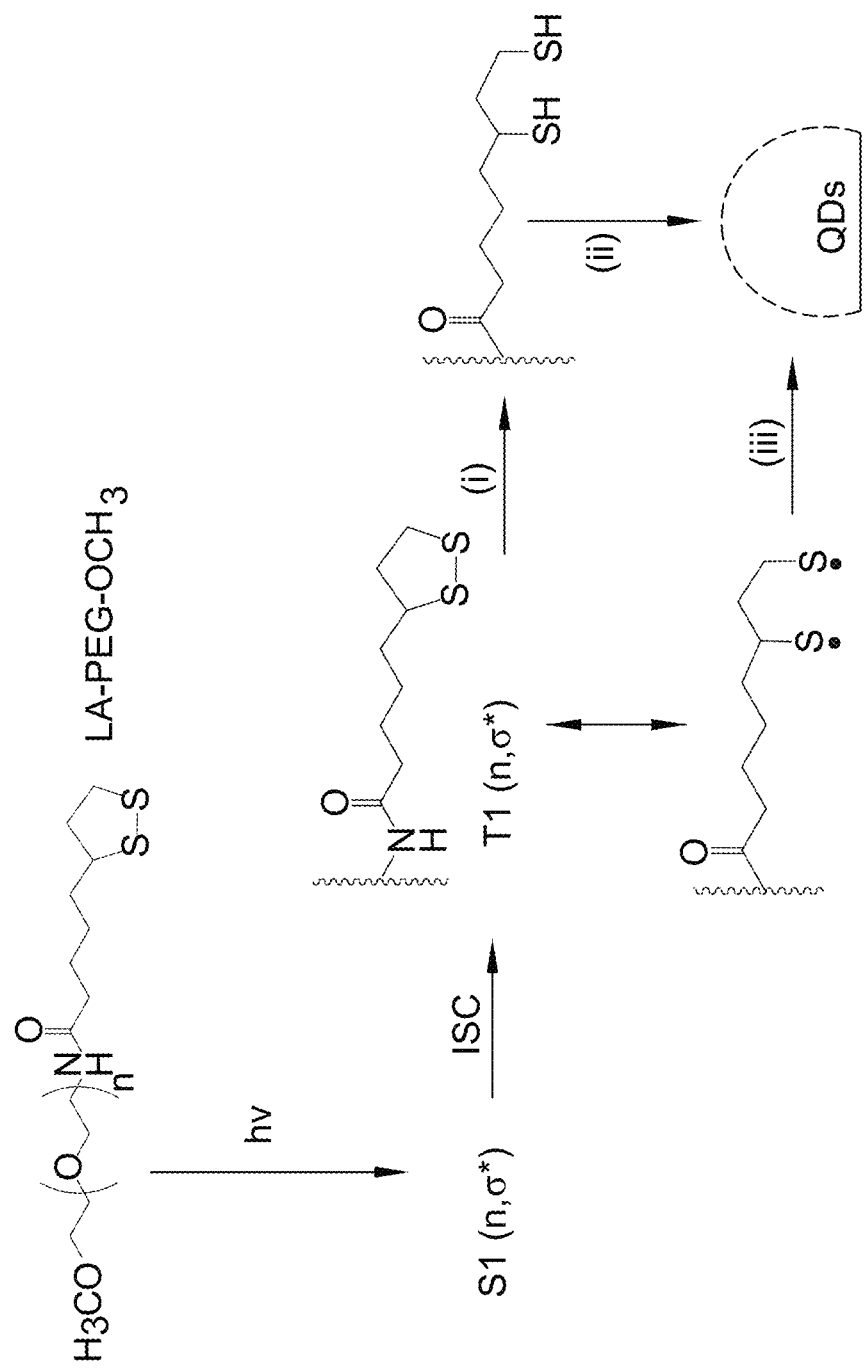
FIG. 1D is a schematic representation of the proposed mechanism(s) for the UV-induced transformation of the LA groups and ligand exchange on the QDs. Following UV excitation the triplet state T1 (n,s*) can produce: bond scission and dithiol formation (i), leading to ligand exchange on the QD (ii), or di-radical formation followed by ligand exchange (iii).

The present invention is directed to a method for preparing nanoparticles such as nanocrystalline materials in both nonpolar and polar solvents. More specifically, the present invention is directed to the photochemically-induced ligand exchange of hydrophobic nanoparticles such as nanocrystalline materials with hydrophilic ligands to thereby mediate the phase transfer of such materials (e.g., quantum dots) between two solvents that are immiscible in each other. For example, in some embodiments, the method of the present invention comprises photochemically-induced ligand exchange of hydrophobic nanoparticles such as nanocrystalline materials with hydrophilic ligands to thereby mediate the phase transfer of such materials from a non-polar solvent to a polar solvent, or the reverse, e.g., from a polar solvent to a non-polar solvent. The non-polar solvent and the polar solvent are immiscible in each other. It has been discovered that the presence of nanocrystals, such as quantum dots, modulates the relative efficiency of the terminal dithiolane ring opening of derivatives of lipoic acid (thioctic acid) by intercepting the dithiolproduct due to the higher affinity of the bidentate ligands to the nanocrystal surfaces. DFT calculations revealed that both the singlet (S1) and triplet (T1) excited states of lipoic acid correspond to n,σ*-transitions which transfer electron density to the antibonding σ*S—S orbital, thus significantly weakening the S—S bond. See FIGS. 1A through 1D. Together, these data suggested the photochemical promotion of the reduction of lipoic acid derivatives and concomitant cap-exchange of hydrophobic ligands with hydrophilic ligands. Not only is light a green reagent with precisely controlled energy but it can also be delivered with high spatial and temporal selectivity.

In some embodiments, the present invention is therefore directed to a method to promote the transfer of nanoparticles such as nanocrystals (e.g., ZnS overcoated, such as CdSe core-plus-ZnS shell) quantum dots (which may be abbreviated to "QDs"), via cap exchange, to buffer media mediated by UV photo-irradiation. More precisely, in some embodiments, the oxidized lipoic acid (LA)-based ligands can be used (without the need for prior reduction of the dithiolane groups) to drive the transfer to polar organic solvents and buffer media, if aided with UV irradiation. In some embodiments, the UV irradiation has a wavelength, 250 nm<$\lambda_{ex}$<400 nm. The process may be applied to several lipoic acid-based ligands, and it involves the UV photo-induced reduction of the LAs to dihydrolipoic acid groups ("DHLAs"), simultaneously coupled with the replacement of a hydrophobic cap, such as a TOP/TOPO cap, with the reduced form of the ligands, all taking place in-situ. In some exemplary embodiments, pure lipoic acid (LA), LA-PEG-OCH$_3$, LA-zwitterion, and mixtures of LA-PEG-OCH$_3$ (or LA-zwitterion) and reactive LA-PEG-FN (with FN being COOH, NH$_2$, or N$_3$) have all been successfully used for the phase transfer. This permits the in-situ introduction of reactive groups onto the nanocrystal surface, affording compatibility with commonly used conjugation techniques such as those based on carbodiimide chemistry. Furthermore, to exemplify the utility of the approach a series of QDs were examined for the in vivo imaging of the brain vasculature of a live mouse, where well-resolved vessel structures up to two hundred microns deep in the tissue through the thinned-skull cranial window can be visualized using intravenously injected QDs, combined with fluorescence emission generated via two-photon excitation.

The method of the present invention is directed to the photo-induced transfer of nanocrystalline particles, such as quantum dots, from one solvent system to another solvent system, wherein the solvent systems are immiscible in each other. The nanocrystalline particles may comprise a core material. The core material may further comprise a shell. The core material and the shell material may be, e.g., semiconductor materials or metallic materials. In some embodiments, the nanocrystalline particles further comprise, before the steps of the method described herein, with a hydrophobic capping material, such as a ligand. The method of the present invention involves the photo-induced exchange of the hydrophobic capping material with a hydrophilic capping material, which thereby mediates the exchange of the nanocrystals from a nonpolar solvent system to a polar solvent system.

In some embodiments of the present invention, the core material comprises a metal. The core material may comprise a single metallic element or it may contain a binary material comprising a metal. In some embodiments, the core material may comprise a ternary material, which may comprise one, two, or three metals. In some embodiments, the core material may be a semiconductor, e.g., a binary semiconductor. In some embodiments, the core material may comprise a nanocrystal. By "nanocrystal" it is meant a crystalline nanoparticle in which all dimensions are less than about 1000 nanometers. Some nanocrystals have at least one dimension less than about 100 nm. A nanocrystal may be monocrystalline or polycrystalline. A polycrystalline material comprises multiple crystal grains of dimensions smaller than the overall dimension of the core particle. Exemplary metal elements that may serve as materials include gold (Au), silver (Ag), platinum (Pt), copper (Cu), nickel (Ni), and alloys thereof. Exemplary binary materials include CdSe, CdS, CdSeS, CdTe, InAs, InP, GaAs, PbSe, PbS, HgSe, and HgTe. Exemplary ternary materials include AgInS$_2$, CuInS$_2$, CdSeTe, ZnCdSe, and ZnCdTe. Core particles may range in diameter from about 2 nanometers to about 500 nanometers, from about 2 nanometers to about 100 nanometers, about 2 nanometers to about 50 nanometers, such as from about 2 nanometers to about 25 nanometers, or from about 5 to about 12 nanometers.

In some embodiments, the core materials may be coated with a shell material. The shell material may comprise a single metallic element or it may contain a binary material comprising a metal. In some embodiments, the shell material may comprise a ternary material, which may comprise two or three metals. The shell material may also be crystalline. The shell material may be monocrystalline or polycrystalline. Exemplary shell materials include ZnS, ZnSe, CdS, ZnSeS, CdS, CdSZn. The thickness of the shell coating may range from about 1 angstrom to about 500 angstroms, such as from about 1 angstrom to about 100 angstroms, such as from about 2 angstrom to about 50 angstroms, such as from about 3 angstroms to about 25 angstroms.

When selecting a core-shell pairing in preparing the nanocrystal, one may consider two goals: 1) the band gap of the shell is preferably wider than that of the core (type I semiconductor QD) which provide better confinement of the e-h carriers within the core of the QD, and 2) the shell may be chosen so that the energy bands are shifted with respect to each other (i.e., valence band, VB, of the shell is higher than that of the core while the conduction band, CB, stay higher than that of the core as in (1) above. This creates the configuration where the electron and hole once created will separate (one in the core and the other in the shell) creating what is known as type II QDs. This structure allows one to shift the emission farther in the red.

In some embodiments, the nanoparticle may comprise a core material comprising CdS, and the nanoparticle may comprise a shell material comprising ZnS. In these embodiments, one or both of the core material and shell material may be crystalline. In some embodiments, the nanoparticle may comprise a core material comprising CdSe, and the nanoparticle may comprise a shell material comprising ZnS. In these embodiments, one or both of the core material and shell material may be crystalline. In some embodiments, the nanoparticle may comprise a core material comprising CdTe, and the nanoparticle may comprise a shell material comprising ZnS. In these embodiments, one or both of the core material and shell material may be crystalline. In some embodiments, the nanoparticle may comprise a core material comprising CdSe, and the nanoparticle may comprise a shell material comprising CdS. In these embodiments, one or both of the core material and shell material may be crystalline. In some embodiments, the nanoparticle may comprise a core material comprising PbSe, and the nanoparticle may comprise a shell material comprising ZnS. In these embodiments, one or both of the core material and shell material may be crystalline. In some embodiments, the nanoparticle may comprise a core material comprising PbSe, and the nanoparticle may comprise a shell material comprising CdSe. In these embodiments, one or both of the core material and shell material may be crystalline. In some embodiments, the nanoparticle may comprise a core material comprising $AgInS_2$, and the nanoparticle may comprise a shell material comprising ZnS. In these embodiments, one or both of the core material and shell material may be crystalline.

In some embodiments, highly luminescent quantum dots are reproducibly prepared by reacting organometallic precursors at high temperature in coordinating solutions. These QDs are typically capped with a hydrophobic capping molecule. In some embodiments, the hydrophobic capping molecule comprises a hydrophobic surfactant. In some embodiments, the hydrophobic molecule is selected from among a long alkyl chain phosphine, a long alkyl chain phosphine oxide, a long alkyl chain amine, a long alkyl chain carboxylic acid, a long alkenyl chain carboxylic acid, and a long chain alkenyl compound. In general, the alkyl and alkenyl chains comprise hydrocarbyl chains having from two to 30 carbon atoms, from four to 30 carbon atoms, from four to 24 carbon atoms, such as from four to 16 carbon atoms, or even from four to 12 carbon atoms, such as eight carbon atoms. An alkyl chain does not comprise unsaturated bonds. An alkenyl chain may comprise from one to about six unsaturated bonds, i.e., one to six double bonds, such as from one to four double bonds, such as one double bond, or two double bonds. Exemplary hydrophobic molecules include trioctyl phosphine (TOP), trioctyl phosphine oxide (TOPO), tributylphosphic acid, alkylamines such as hexadecylamine, oleic acid, and octadecene. The quantum dots prepared with hydrophobic materials are dispersed in non-polar organic solvents. Non-polar solvents include, e.g., hexanes, chloroform, pyridine, and toluene. Although not critical to the method of the present invention, the coating of hydrophobic organic material over the nanocrystalline core material has a thickness generally between about 0.5 nanometers and about 10 nanometers, such as about 1 nanometer to about 2 nanometers.

According to some embodiments of the method of the present invention, light induces transfer of quantum dots (e.g., core-shell particles) capped with hydrophobic organic shells from one solvent system to another solvent system, in which the solvent systems are immiscible in each other. For example, the method of the present invention may comprise light induced transfer of quantum dots from a nonpolar solvent to a polar solvent via the replacement of the hydrophobic capping molecules with hydrophilic capping molecules. In some embodiments, the hydrophilic capping molecules are hydrophilic surfactants. In some embodiments, the hydrophilic capping molecules comprise a moiety that is reactive with or may become reactive with the surface of the nanoparticle, e.g., an oxidizable moiety that may become reactive with the metal surface of a quantum dot by irradiation.

In some embodiments, a suitable hydrophilic capping molecule may have any of the following general structure (I):

Structure (I)

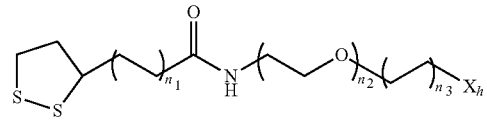

wherein $n_1$, $n_2$, and $n_3$ are each independently integers having a value between 0 and 20, such as between 1 and 20, and $X_h$ comprises a functional group.

In some embodiments, $n_1$ has a value between one and four, such as one or two. In preferred embodiments, $n_1$ is two. In some embodiments, $n_2$ has a value between 8 and 20, such as 12 or 15. In some embodiments, $n_2$ has a value between one and four, such as one or two. In some embodiments, $n_2$ has a value of zero. In some embodiments, $n_3$ has a value between 8 and 20, such as 12 or 15. In some embodiments, $n_3$ has a value between one and four, such as one or two.

In some embodiments, the $X_h$ functional group may comprise a hydrophilic functional group. In some embodiments, the $X_h$ functional group may comprise a reactive functional group. In some embodiments, the functional moiety may be selected from among —$OCH_3$, —$NH_2$, —$N_3$, and any of the following structures:

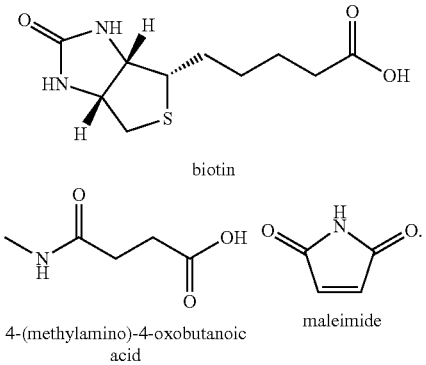

biotin 4-(methylamino)-4-oxobutanoic acid maleimide

In some embodiments, the hydrophilic capping molecule may have the following structure (II):

Structure (II)

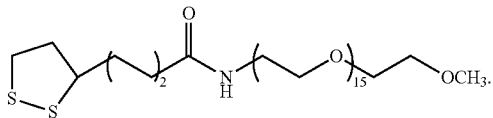

In some embodiments, the hydrophilic capping molecule may have the following structure (III):

Structure (III)

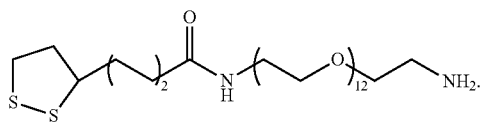

In some embodiments, the hydrophilic capping molecule may have the following structure (IV):

Structure (IV)

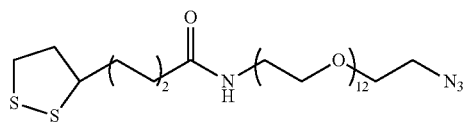

In some embodiments, the hydrophilic capping molecular may have the following structure (V):

Structure (V)

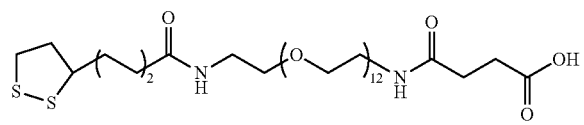

In some embodiments, a suitable hydrophilic capping molecule may have any of the following general structure (VI):

Structure (VI)

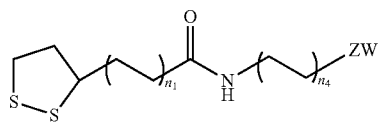

wherein $n_1$ has a value between 1 and 20, $n_4$ has a value between 1 and 20, and ZW is a zwitterionic moiety. In some embodiments, $n_1$ has a value between one and four, such as one or two. In preferred embodiments, $n_1$ has a value of two. In some embodiments, $n_4$ has a value between one and four, such as one or two. In preferred embodiments, $n_4$ has a value of two.

In some embodiments, $n_2$ has a value of 2 and ZW comprises a dimethylaminopropane sulfonate. In some embodiments, the combined $n_2$ and ZW comprises the following structure:

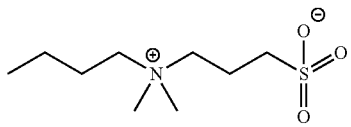

In some embodiments, the hydrophilic capping moiety may have the following structure (VII):

Structure (VII)

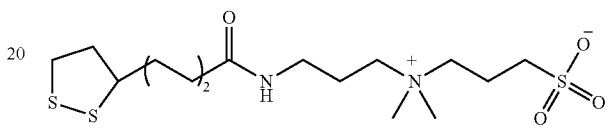

The method of the present invention is directed to the photo-induced, e.g., UV-promoted, phase transfer of quantum dots between immiscible solvents. In some embodiments, hydrophobic QDs are first precipitated as a "paste," then mixed with a polar solvent, such as methanol or 1-propanol containing LA-based ligands, followed by UV irradiation. In some embodiments, a biphasic mixture is prepared comprising a polar solvent system and a non-polar solvent system. The non-polar solvent system comprises nanoparticles, e.g., quantum dots, having hydrophobic capping moieties. The polar solvent system comprises hydrophilic ligands. This embodiment involves irradiation of a biphasic mixture, with the non polar phase (e.g., hexane) containing the TOP/TOPO-capped QDs and the other is made of the ligand dispersed in a polar solvent that is immiscible with hexane (e.g., methanol and dimethylformamide, DMF). In either procedure, the ligand exchange progressively alters the solubility of the native QDs, and promotes their transfer to the polar solvent(s).

While both methods allow the effective phase transfer of the nanocrystals to polar solvents and subsequently to water, each route offers certain advantages and flexibility. For example, in the embodiments wherein a paste is prepared, several polar solvents may be used, each with inherently distinct chemical properties for the phase transfer, such as reducing capacity, polarity and boiling temperature. Using this route, we have carried out the phase transfer using methanol, ethanol, 1-propanol, 2-propanol, n-butanol, tert-butanol, DMF and acetonitrile (combined with LA-PEG ligands), though the quality of the final water-dispersed nanocrystals may slightly vary from one solvent to another (see Table 1). In comparison, the two-phase reaction is better suited (i.e., perhaps the only one) for phase transfer using LA-ZW, because of the stringent solubility conditions of the ligands; LA-ZW is soluble in methanol, 1-propanol, DMF and water (highly polar solvents). Furthermore, because the light-induced ligand exchange with LA-ZW promotes nanocrystal precipitation, this approach not only provides a photochemical way to transfer QDs between solution and solid phases, it also allows a convenient means to purify the newly capped QDs (these are not dispersible in either hexane or methanol). The only required operation is to remove excess LA-ZW and the released TOP/TOPO along with the supernatant. The biphasic mixture can be used with all LA-based ligands.

TABLE 1

Characteristic optical and spectroscopic data for QDs dispersed in water following transfer using one phase route with various polar solvents and in the presence of LA-PEG-OCH$_3$, or transfer using two phase route in the presence of LA-PEG-OCH$_3$ and LA-ZW ligands. This set of data is collected from 543 nm-emitting QDs. Similar data were measured from other nanocrystal dispersions.

| | One Phase Route with LA-PEG-OCH$_3$ | | | | | | | |
|---|---|---|---|---|---|---|---|---|
| Solvent | Methanol | Ethanol | 1-Propanol | 2-Propanol | 1-Butanol | t-Butanol | DMF | Acetonitrile[#] |
| Irradiation time (min) | 20-25 | 20-30 | 15-20 | 100-120 | 90-100 | 20-30 | 55-65 | 90-100 |
| Abs peak shift (nm) | No | 2-3 | No | No | No | 4-5 | 2-3 | 2-3 |
| PL peak shift (nm) | 1-3 | 6-8 | 1-3 | 5-7 | 6-8 | 12-15 | 4-6 | 3-5 |

| | Two Phase Route with LA-PEG-OCH$_3$ | Two Phase Route with LA-ZW | | Two Phase Route with LA |
|---|---|---|---|---|
| Solvent | Methanol/Hexane | Methanol/Hexane | Methanol/DMF | Methanol/Hexane |
| Irradiation time (min) | 20-25 | 45-60 | 35-45 | 30-40 |
| Abs peak shift (nm) | No | No | No | 1-2 |
| PL peak shift (nm) | 1-3 | No | No | 1-3 |

[#]Acetonitrile provides comparatively less bright QDs

Figure 2A:
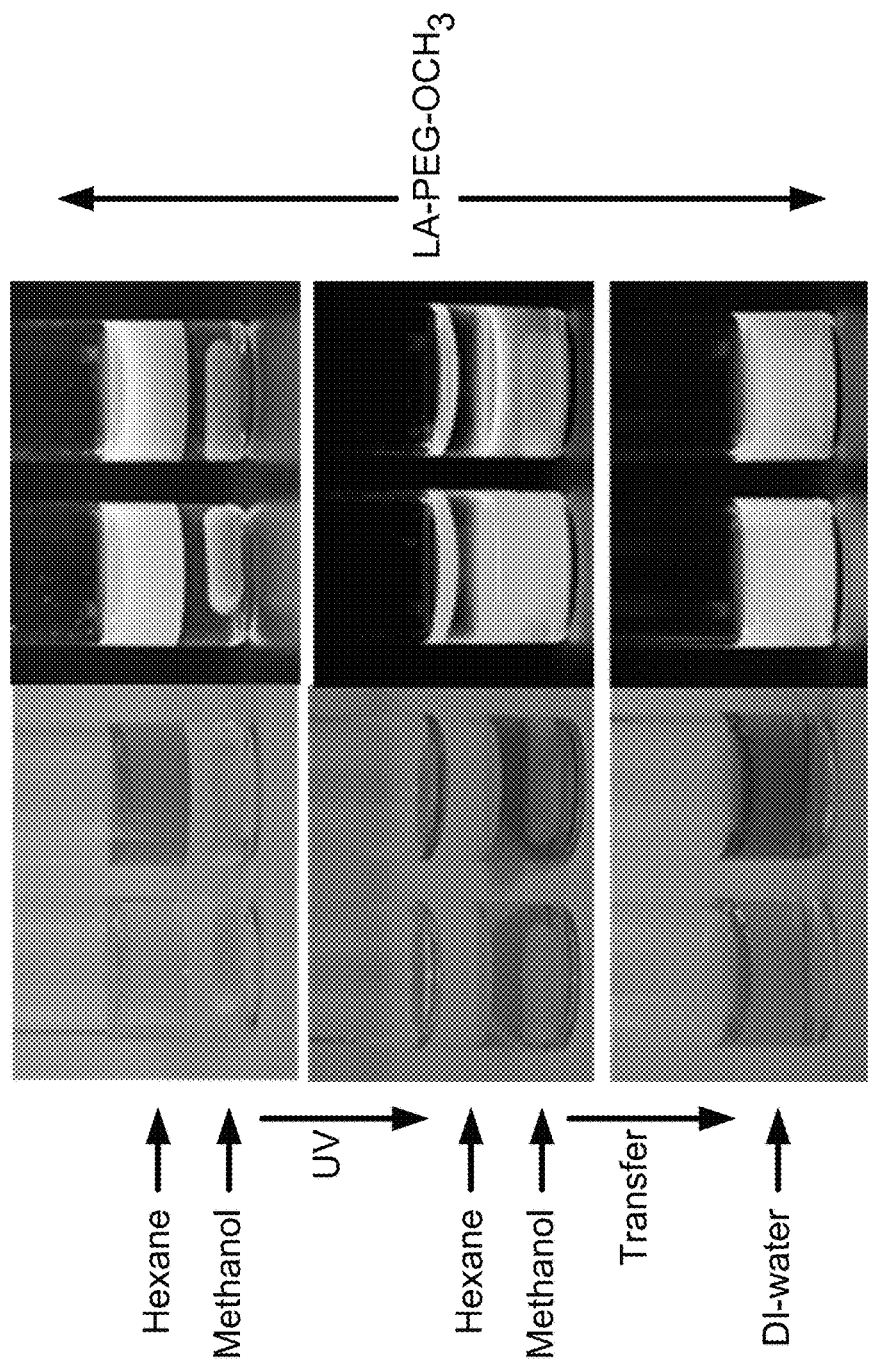
FIGS. 2A and 2B are panels showing white light and fluorescent (collected using hand-held UV lamp, with $\lambda_{exc}$=365 nm) images of vials containing biphasic mixture of QDs in hexane (top phase) and LA-based ligand in methanol (bottom phase), before and after UV irradiation for 30 min; (A) and (B) correspond to the procedures carried out using LA-PEG and LA-ZW ligands, respectively; the final QD dispersions in DI water are shown.
Figure 2B:
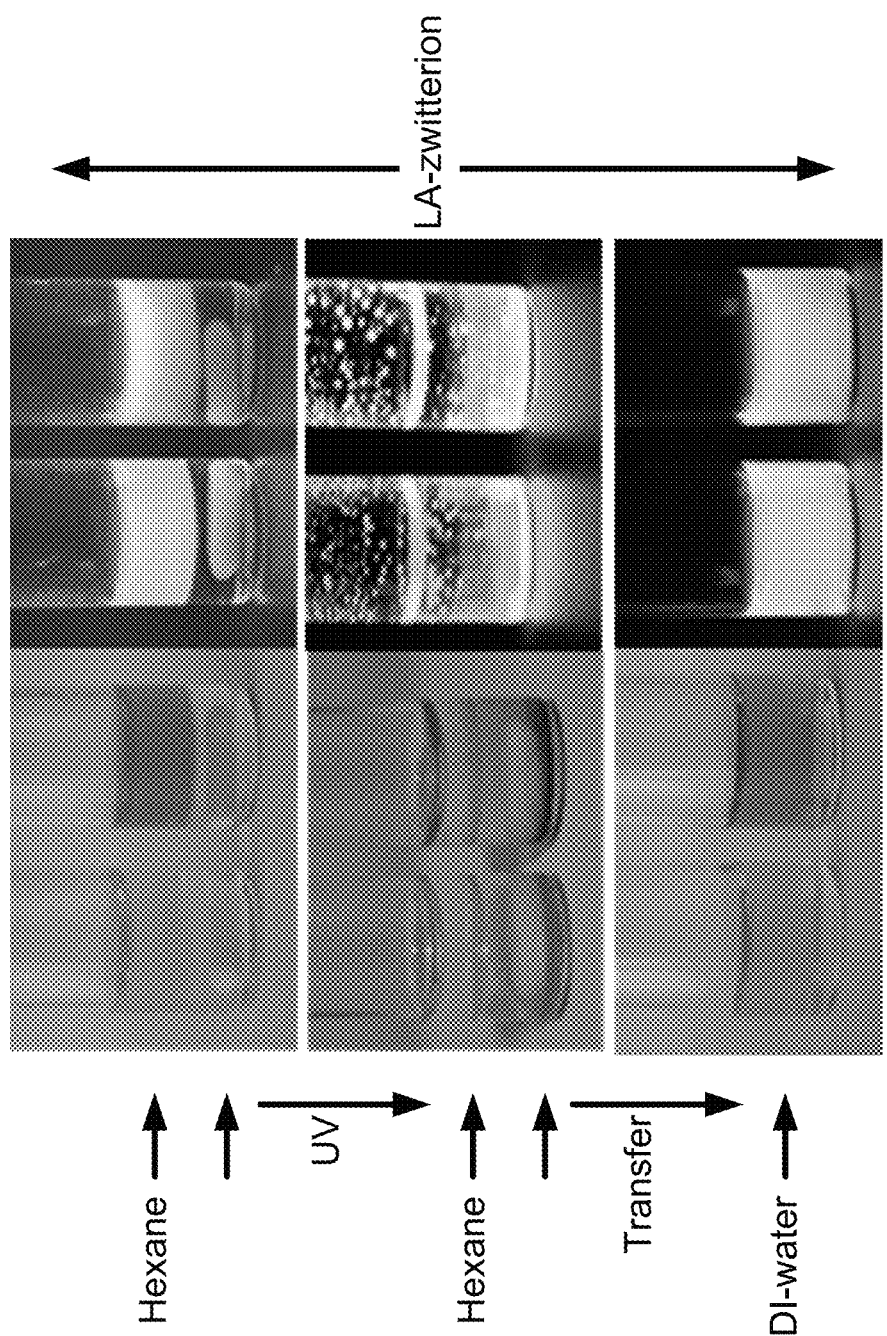
Figure 2C:
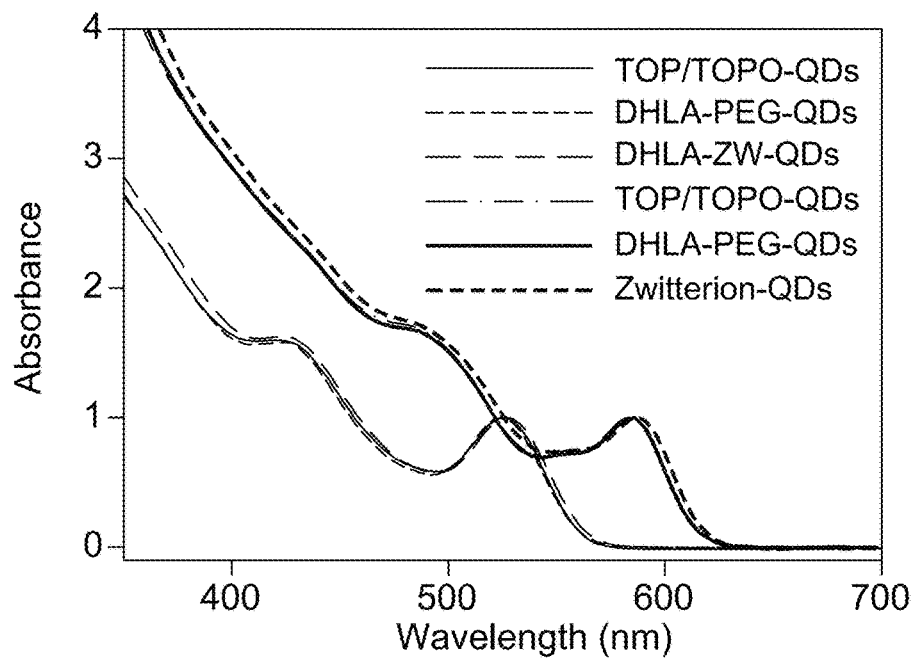
FIG. 2C is normalized absorption spectra (with respect to the band edge peak) before and after phase transfer.
Figure 2D:
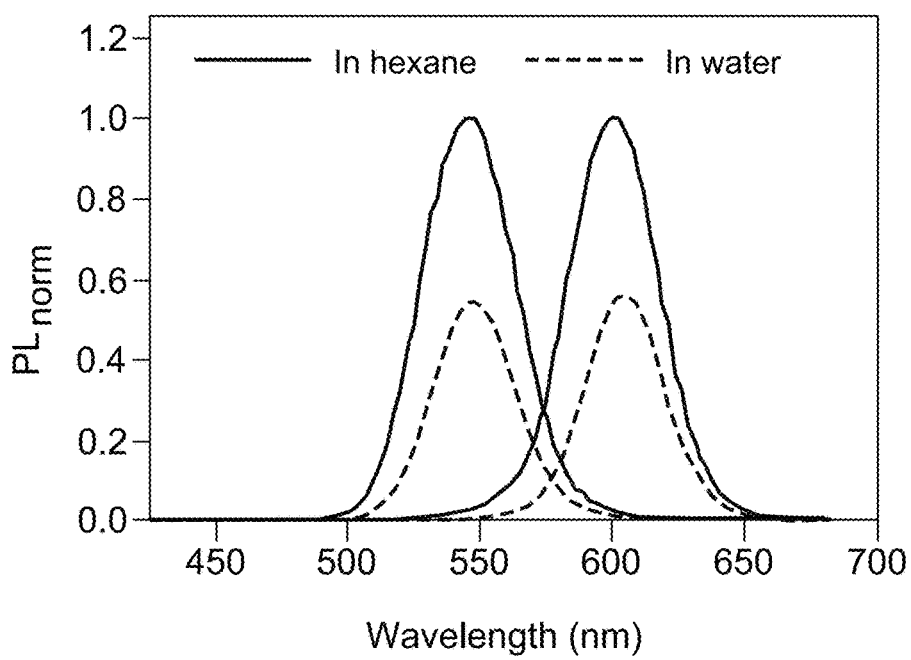
FIG. 2D is PL spectra of QDs in toluene and following phase transfer to water; spectra were normalized with the respect to peak value of TOP/TOPO-QDs. The PL spectra were collected from dispersions having the same optical density (O.D., i.e., same concentration) at the excitation line $\lambda_{exc}$=350 nm. Green and red lines correspond to the green and orange emitting QDs; the solid lines designate dispersions in toluene while dashed lines correspond to dispersions in water.

Having established that UV-irradiation could effectively replace the conventional multi-step phase transfer of QDs using NaBH$_4$-reduced ligands, this method was tested to determine the effects on the optical and spectroscopic properties of the nanocrystals. The absorption and PL spectra were obtained of various size ZnS-overcoated QDs following phase transfer using lipoic acid (LA), LA-PEG-OCH$_3$ or LA-ZW ligands to those of the native TOP/TOPO-QDs. The spectroscopic properties were indeed essentially unchanged. FIG. 2D shows the absorption and PL spectra of green- and orange-emitting CdSe—ZnS QDs, dispersed in hexane (TOP/TOPO-capped) and in PBS buffer following UV-induced phase transfer using LA-PEG-OCH$_3$. Similar optical data were collected from other (blue-, yellow- and red-emitting) QDs, and with other LA-based ligands. Initially, occasionally a slight red shift (4-7 nm) in the emission was measured for dispersions prepared using LA-PEG ligands and extended UV-irradiation time (~45-60 min, data not shown). (A slight red shift can similarly be measured for dispersions prepared using the conventional route with borohydride-reduced ligands.) See Reference 32. However, upon further exploration, it was determined that addition of a small amount of tetramethyl ammonium hydroxide (TMAH) to the cap exchange reaction, shortens the necessary irradiation time for a full phase transfer to 20-25 min, and produced water dispersions that exhibited negligible red shift in the PL peak location (e.g., 1-3 nm shift with 1-propanol and methanol, see Table 1). Transfer of nanocrystals in the presence of LA-ZW ligands required longer irradiation time (~45-60 min), while producing hydrophilic QDs with essentially no shift in their PL or absorption spectra compared to the native hydrophobic materials (see Table 1).

Figure 7:
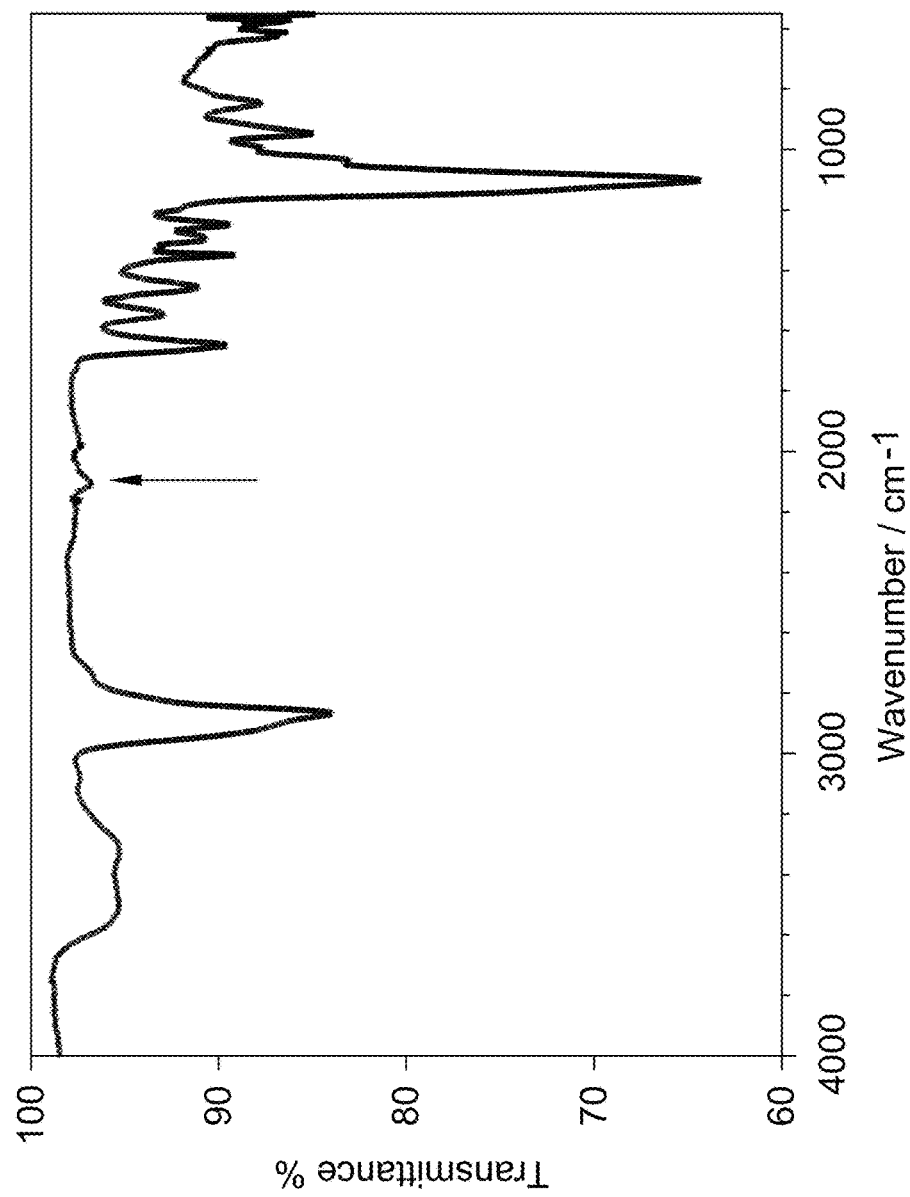
FIG. 7 is an FT-IR spectra of QDs dispersion in DI water (phase transferred via UV-irradiation) surface-functionalized with a mixture of LA-PEG$_{750}$-OCH$_3$/LA-PEG$_{600}$-N$_3$ (85%/15%). The arrow shows the typical azide signal at 2100 cm$^{-1}$.

Using this strategy, it is possible to introduce functional/reactive groups on the surface of the hydrophilic nanocrystals, by co-mixing a molar fraction of end-functionalized LA-PEG ligands (e.g., LA-PEG-NH$_2$ or LA-PEG-COOH, measured with respect to the total amount of ligands used) prior to UV treatment. Indeed, this produces hydrophilic QDs which have a statistically controlled distribution of the desired functional groups on their surfaces, as shown by the gel electrophoresis panel in FIG. 3B. Clearly the sign and magnitude of the mobility shift depend on the nature of the groups introduced (e.g., amine versus carboxy in this case) and on the molar fraction used, with larger mobility shifts measured for higher fractions of end-functionalized ligands used. See Reference 32. Additional proofs for introducing azide groups onto the QD surfaces relied on FT-IR spectroscopy. See FIG. 7.

Next, the quantum yield of QDs transferred to buffer media using the UV-promoted strategy was measured. It was found that the method of the present invention reliably produces materials which exhibit comparable or slightly higher PL quantum yields than those transferred using the conventional two-step method (with DHLA-PEG ligands). The PL quantum yields measured for the present hydrophilic QDs are ~50-70% smaller than those measured for the native hydrophobic materials, and is consistent with what has been reported in the literature using thiol-based ligand exchange. See References 29-31, 36, 37, and 43.

Figure 8:
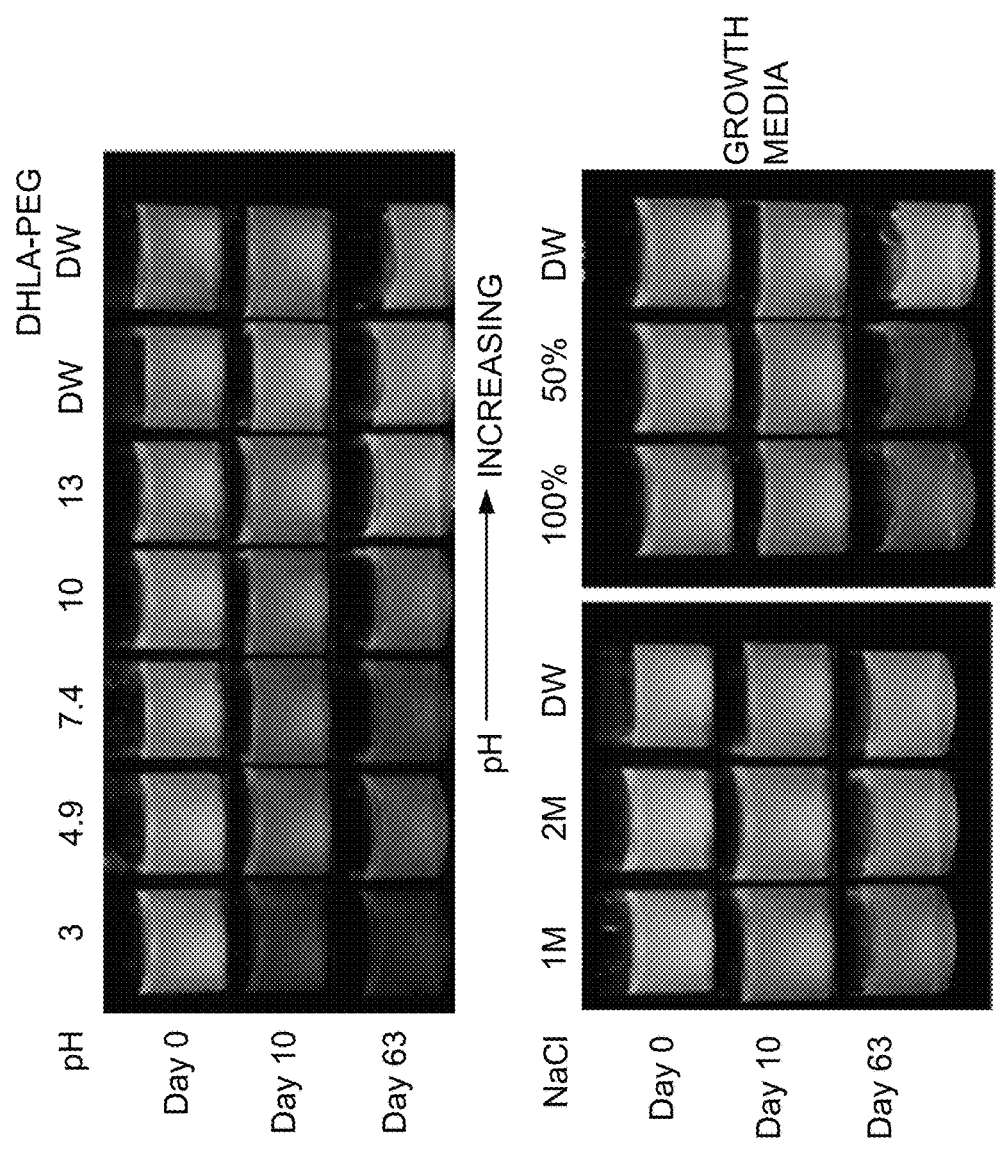
FIG. 8 depicts (Top) Fluorescence images of vials containing green-emitting CdSe—ZnS QDs phase transferred UV irradiation with LA-PEG ligands dispersed in different phosphate pH buffers along with one control sample in deionized water. A control sample prepared using NaBH$_4$-reduced ligand (conventional route) is also shown. The QD concentration is ~1.0 μM in all dispersions. (Bottom) Fluorescence images of vials containing QDs dispersed in growth media and in buffer plus 1M and 2M NaCl. Images were collected on freshly prepared and after 10 and 63 days of storage.

An important property of the hydrophilic nanocrystal material is colloidal stability. The aggregation propensity of QD dispersions prepared according to the method of the present invention was compared to those produced using cap exchange with NaBH$_4$-reduced ligands. FIG. 3A shows images of several dispersions of green- (left), yellow- (center) and orange- (right) emitting QDs dispersed in buffers with pH ranging from 3 to 13 immediately following transfer and after several weeks of storage, side-by-side with dispersions in DI water. FIG. 3B also shows images of the same QD dispersions containing excess electrolytes (1 and 2M NaCl) and in cell growth media, freshly prepared and after several weeks of storage. Additional stability tests on these QDs, along with a comparison to those prepared using the conventional procedure (using DHLA-PEG-OCH$_3$) were conducted. See FIG. 8. These images demonstrate that the UV-promoted ligand exchange reaction can be used to access materials that are on par with, or even better than those prepared using the conventional route and DHLA-ligands. In actual practice, the QD dispersions are colloidally stable for at least several months of storage. See References 30 and 32.

Further examining the scope of the UV-promoted LA-ligand transfer demonstrated that this approach can be directly applied to core only CdSe QDs using the same conditions applied to ZnS-overcoated QDs, albeit a near complete loss in the QD photoemission. Similarly, it has been determined that the UV-promoted ligand exchange can be easily applied to gold nanoparticle.

Fluorescence Imaging of the Brain Vasculature of Live Mice.

Optical reagents find frequent and highly varied applications in the study of biological processes in-vitro and in-vivo. In general, useful labels must combine several features that are suitable for the targeted experiment, including optical properties (QY, specific excitation and emission spectrum, photostability), physical properties (size, charge, solubility, chemical and colloidal stability), biologic properties (stability towards metabolic degradation, tissue partitioning and lack of toxicity); importantly, they must be amenable to functionalization using facile and ideally diverse chemistries. For example, live animal imaging experiments have demanding requirements for dye performance and stability. Ideally, a marker dye will have high QY, a tunable emission spectrum, good stability toward degradation and elimination over several hours, and should have no intrinsic partitioning into the brain. Among several investigations into the utility of QDs prepared via UV-induced phase transfer, the performance of these reagents were examined for imaging the brain vasculature over a 24 hour period in mice. The fluorescent QD is used to verify the integrity of the blood-brain barrier after various manipulations. CdSe—ZnS QDs exhibit very large two-photon absorption cross section, with values as high as 47,000 Goeppert-Mayer units; these are about three orders of magnitude higher than those of conventional dyes and fluorescent proteins. See References 8, 9, and 48. Furthermore, Webb and co-workers showed that combined with the use of NIR irradiation two-photon fluorescence using QDs could allow deep tissue imaging with reduced background contributions. See Reference 8.

According to the present invention, two-photon fluorescence imaging of the brain vessels (including capillaries) of live mice was performed using QDs phase-transferred in the presence of LA-PEG-OCH$_3$ or LA-ZW ligands. Thinned skull cranial window surgeries were performed following the procedures detailed in reference 49. 6-7 month C57BL6 mice were first anesthetized with ketamine and xylazine (80 mg/kg ketamine, 12 mg/kg xylazine). A ~500 μm region over the somatosensory cortex were thinned to ~20 μm. Then the animals were intravenously injected with 10-30 μL of QDs dispersed in PBS buffer (at ~0.1 μM in blood). The first set of images was acquired 5 min after injection, followed by additional ones collected after 30 min, 2 h and 24 h.

Figure 4A:
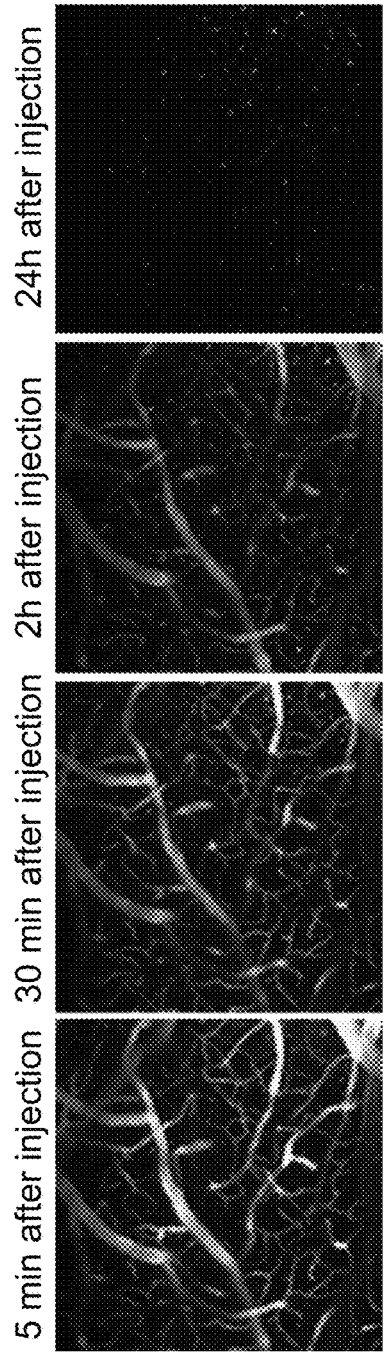
FIGS. 4A and 4B are images of the blood brain vasculature collected from two separate animals, micro-injected with QDs phase transferred with LA-PEG$_{750}$-OCH$_3$ ligands (FIG. 4A), or with QDs phase transferred using LA-ZW ligands (FIG. 4B). The panels in each row correspond to images collected after a given time lapse following QD delivery. The well-resolved structure of the blood vessels and capillaries are detected at a depth exceeding 200 μM below the skin. QD signal progressively decreases with time before reaching background levels after ~2 hours.
Figure 4B:
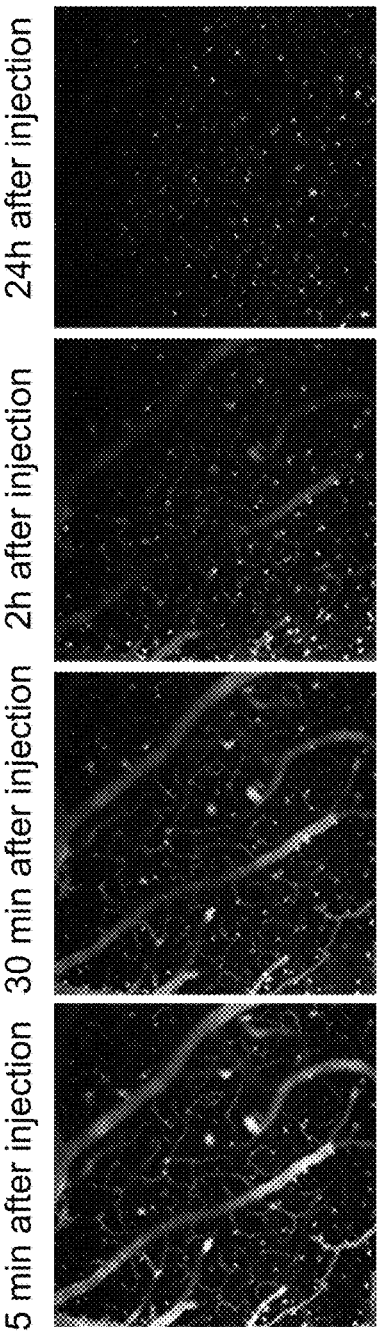

The collected fluorescence images clearly show well resolved capillary structures with a submicron resolution, and the vasculature was imaged up to ~200 μm deep (from the surface). See FIG. 4. The QDs remained visible in the blood circulation for up to 2 hours, and then decreased to background levels after 24 hours, which may make them suitable for drug delivery in a pharmako-kinetic point of view. The clearance of QDs from the blood is likely due to the renal filtration. See Reference 50. The ability to image the blood brain capillary for such extended period of time constitutes a very promising capability, as it permits one to investigate the structure of blood capillaries in the brain of live animals. With molecular scale dyes (such as fluorescein, or 4 k dextran conjugated FITC), data can be collected only for a few minutes, due to combination of accelerated photobleaching of the dye and rapid clearance. See Reference 50. QDs in comparison provide a high signal-to-noise ratio and due to a combination of their nanometer size and PEG coating their half life circulation is longer, allowing extended imaging of the capillaries. It is also worth noting that the concentration of QDs used in this study to label brain vessel is only ~10% of that used in previous work, further confirming the great utility of the QDs to label even the finest vessels (structure <10 μm in diameter, see arrow). See Reference 8.

Proposed Mechanism.

The above set of data combined can be used to develop a mechanistic insight into what drives the phase transfer of the nanocrystals. In preferred embodiments, irradiation in the UV range (250<λ<400 nm) yields successful and effective phase transfer of the QDs. Irradiation in the "visible" provides only partial transfer of the nanocrystals and the stability of the resulting nanocrystals is rather poor. UV-promoted transfer requires an optical irradiation for ~20-60 minutes (at ~4.5 mW/cm$^2$), with the exact time depending on the overall QD concentration and nature of the ligands used; higher of QDs and/or ligands require longer irradiation times. Rapid and complete phase transfer generally requires a large excess of LA-based ligands with respect to the QD concentration (~10,000-20,000 times excess). However, an effective UV-facilitated phase transfer can be achieved with concentrations of ligands about one half of what is used in a conventional phase transfer. To investigate the effect of UV-irradiation on the ligands, a series of control experiments were conducted wherein solutions of the ligands (LA, LA-PEG and LA-ZW) were loaded in a 1 cm quartz cuvette and irradiated without addition of QD materials. Under these conditions, irradiation produced a progressive reduction in the absorption peak centered at ~340 nm (signature of the LA group) with time, with a near complete disappearance of that peak after 25-30 min (see FIGS. 5A and 6A through 6D). Similar observations have been reported for UV-irradiated pure lipoic acid in polar solvents, see Supporting Information and reference. See Reference 47. UV-induced transformation of the ligand can be effectively accomplished in a variety of solvents, including polar protic solvents (e.g., methanol and 1-propanol) and aprotic solvents (e.g., DMF and acetonitrile). UV-irradiation of the ligand dispersed in non-polar, or hydrogen-depleted solvents produced a much slower progression in the LA-related UV absorption feature (peak at ~340 nm) without reaching saturation.

Figure 5A:
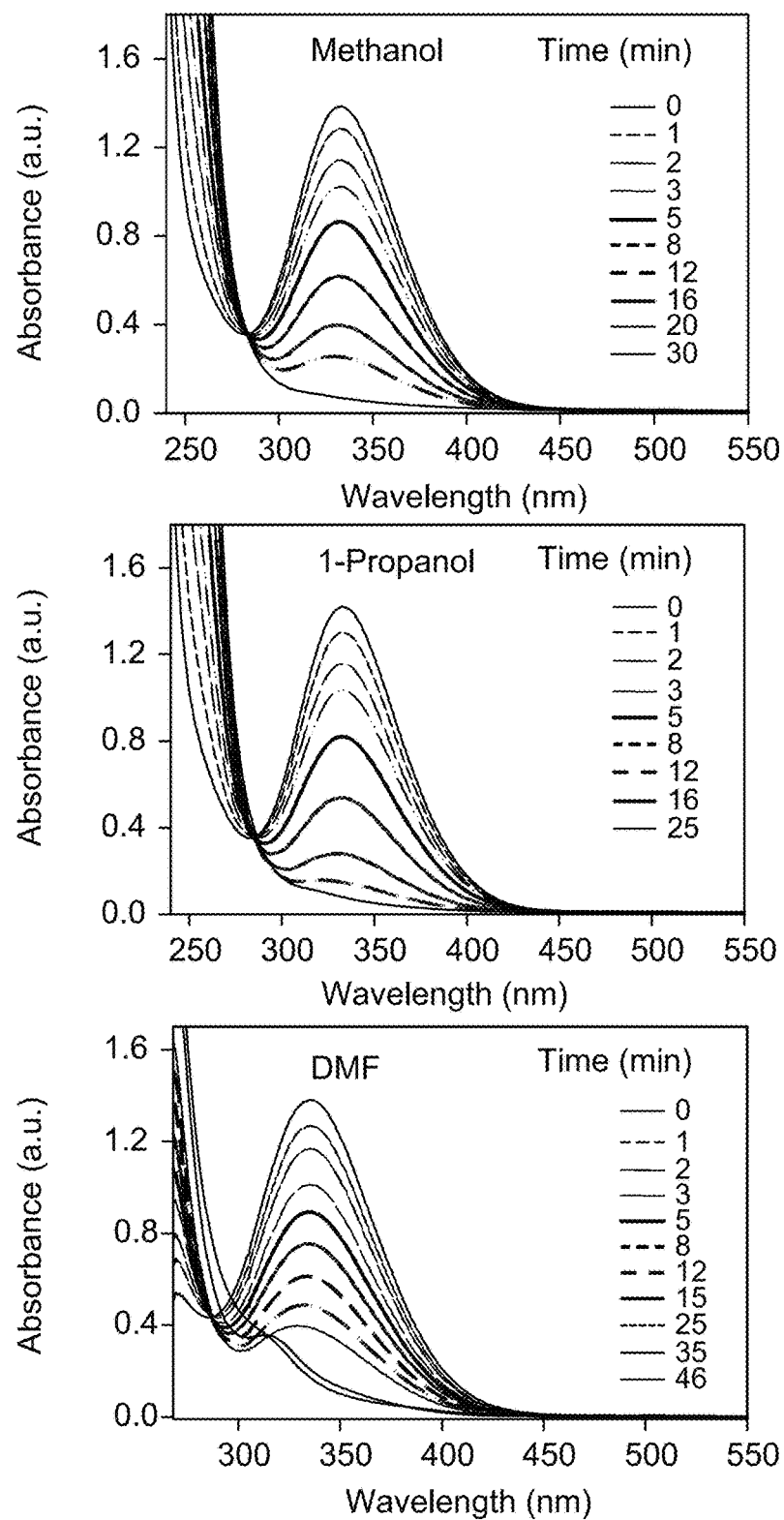
FIG. 5A depicts the progression of the UV absorption spectra of 1 mM LA-PEG$_{750}$-OCH$_3$ dissolved in methanol, 1-propanol and DMF, respectively, collected after irradiation times varying from 1 to 30 min; ligand concentration was ~10 mM.
Figure 5B:
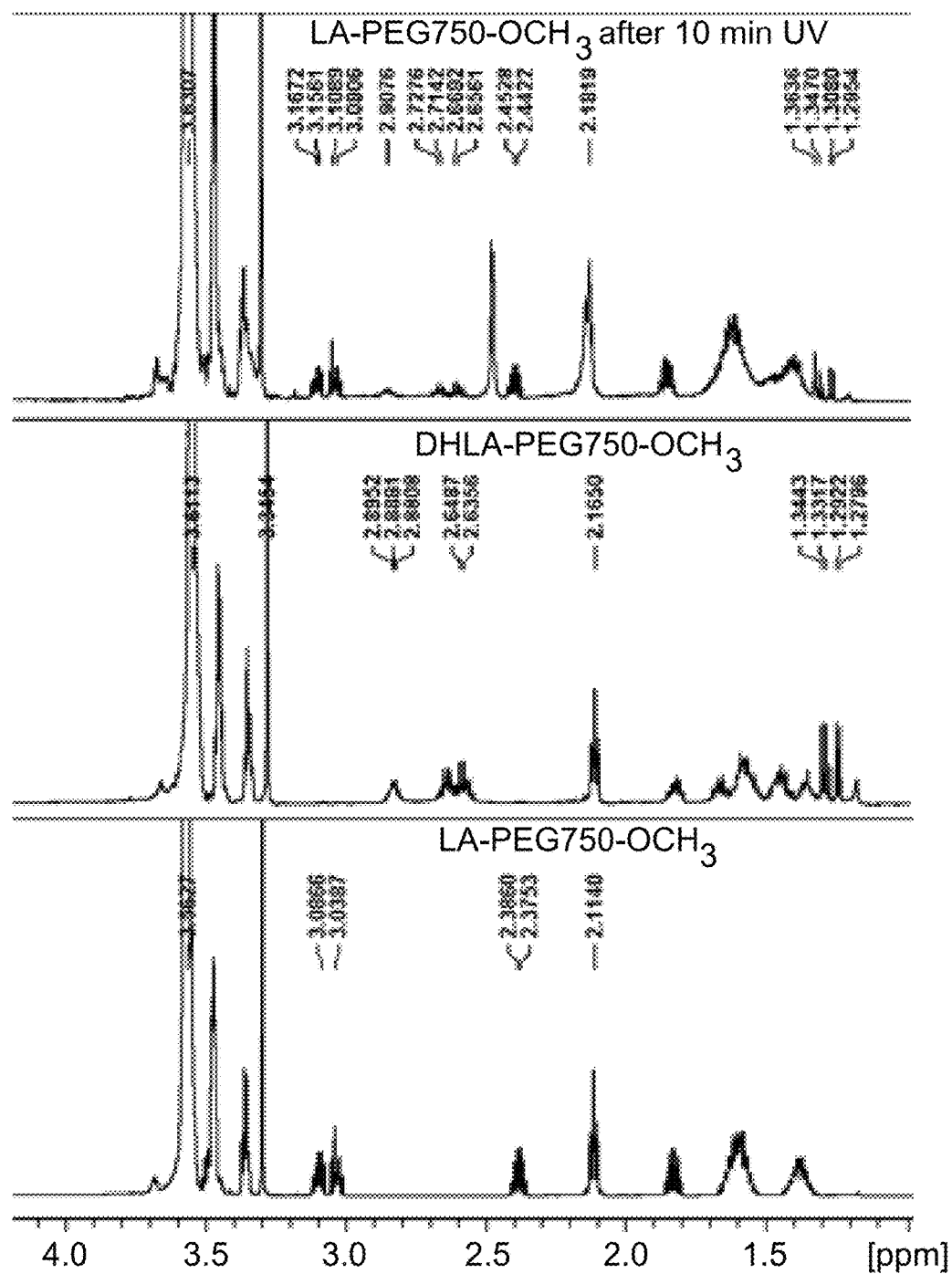
FIG. 5B are $^1$H NMR spectra collected from LA-PEG$_{750}$-OCH$_3$ (bottom), NaBH$_4$-reduced LA-PEG$_{750}$-OCH$_3$ (center) and LA-PEG$_{750}$-OCH$_3$ following UV irradiation for 10 minutes and drying under vacuum (top); a mixture of oxidized (LA with peaks at 2.3-2.35 and 3.1 ppm) and reduced (DHLA with peaks at 1.2 and 1.3 ppm attributed to thiols) terminal groups are present. All spectra were collected from ligand dissolved in CDCl$_3$. The peak at ~2.5 comes from impurities.
Figure 6B:
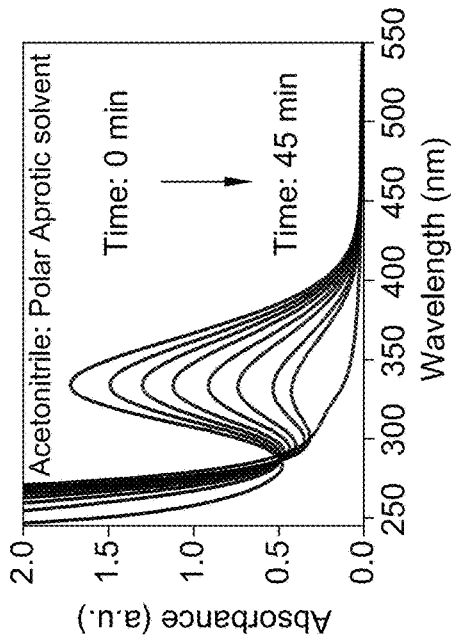
FIGS. 6A through 6D depicts the progression of the UV-vis absorption spectra of LA-PEG-OCH$_3$ (dispersed in various solvents) with UV-irradiation time. The solution volume and ligand concentration were 2.5 mL and ~1.23×10$^{-2}$M, respectively. Samples were irradiated at 350 nm with a power of ~4.5 mW/cm$^2$.
Figure 6D:
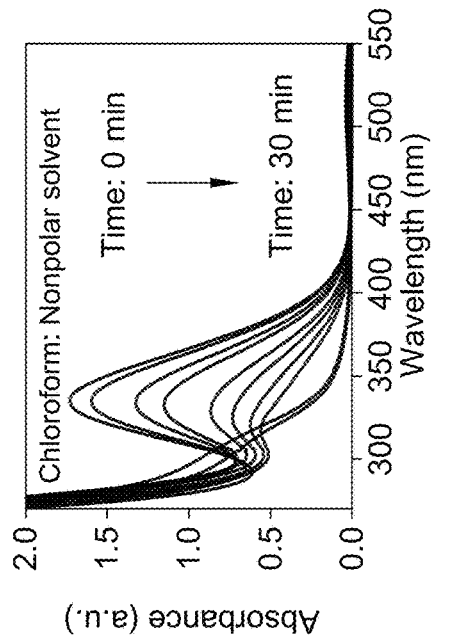
Figure 6A:
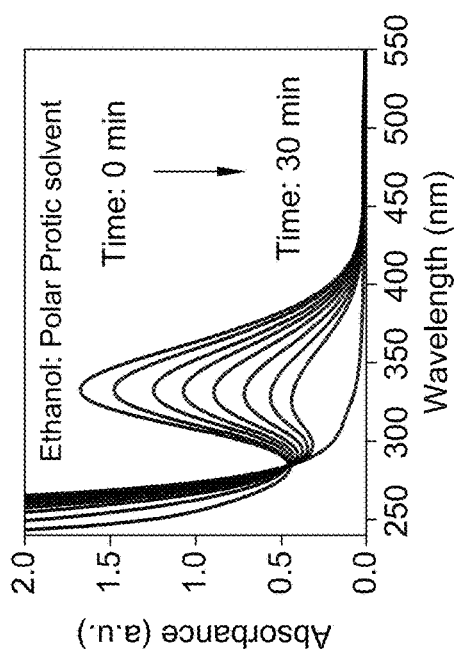
Figure 6C:
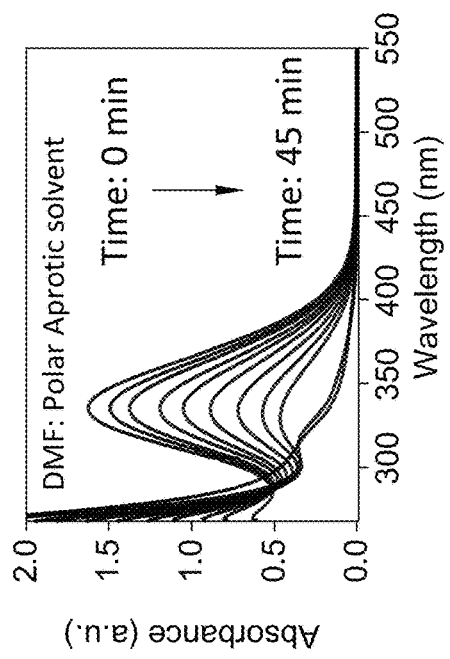

The $^1$H NMR experiments on the ligands indicate that during irradiation, progressive transformation of the disulfide group to dithiol takes place even in the absence of QDs (see FIG. 5B). This change is reflected in the appearance of characteristic DHLA NMR signals such as a triplet and doublet at 1.30 and 1.25 ppm (for the SH group at a primary and secondary carbons, respectively), and the multiplets at 2.8 and 2.6 ppm which coexist with those of LA resonances at 3.1 and 2.3-2.35 ppm. The new set of the NMR peaks is identical to the key NMR signals of NaBH$_4$— reduced LA. See References 30 and 37. The additional broad peaks indicate that the reduction of the disulfide promoted by UV excitation (which requires hydrogen atoms to complete the transformation to dithiols) involves modification of the alkyl chain. This molecular-level chemistry associated with photo-induced reduction of the LA-containing ligands will be investigated in future studies. Note that such H-atom transfers are not needed for stabilizing the open form when QDs are present.

Taken together, the above results suggest that LA-ligands undergo UV-induced reduction of the disulfide ring, a process that is accelerated when irradiation occurs in the presence of QDs. The solvent- and wavelength-dependent nature of the reduction reaction can be exploited to improve the operational process for obtaining pure and stable QDs with water solubilising LA ligands. When QDs are present in the medium they can serve two facilitating roles: 1) acting as photo-sensitizers, providing excited electrons to enhance the reduction of the ligands (see References 51 and 52); 2) providing a sink for reaction products by virtue of the large surface area for preferential binding of reduced LAs, due to the higher affinity of dithiol to the QD surface. The photoinduced electron transfer requires close proximity between the LA groups and the nanocrystal surfaces protected by the TOP/TOPO ligands. Because the QD photo-excitation contribution to the overall ligand reduction is further decreased by the relatively low concentration of both reagents in these experiments (~100 mM ligands and ~1.5-2.5 µM QDs) (they are also in different phases); the coupling of the reduction process with cap exchange on TOP/TOPO-QDs is likely to play an important role in driving the phase transfer reaction to completion.

In conclusion, the present invention involves a new strategy to promote the transfer of luminescent quantum dots, QDs, (and potentially other inorganic nanocrystals) to polar solvents and buffer media mediated by UV photo-irradiation. This strategy provides highly luminescent hydrophilic QDs of various sizes that show remarkable colloidal stability and maintain the original optical and spectroscopic properties of their hydrophobic counterparts. The flexibility of this strategy is illustrated by the preparation of hydrophilic nanocrystals with controllable nature and density of reactive functionalities. This approach presents a range of exciting possibilities for expanded functional group compatibilities and reaction orthogonality on the nanocrystal surfaces. The procedure is simple to implement, effective, and has the potential to be extended to a variety of inorganic nanocrystals. The effectiveness of these QD materials to visualize for several hours the blood capillary in the brain of live mice has been demonstrated.

Having described the invention in detail, it will be apparent that modifications and variations are possible without departing from the scope of the invention defined in the appended claims.

EXAMPLES

The following non-limiting examples are provided to further illustrate the present invention.
Materials and Methods.

Detailed information about the ligand synthesis and characterization can be found in previous reports. See References 30-33 and 35. Below we briefly describe the experimental procedure used for the transfer of QDs using the "one phase reaction" (route 1) in the presence of LA and LA-PEG, or the "two phase reaction" (route 2) in the presence of LA, LA-PEG, and LA-ZW.
Transfer of Quantum Dots Using a One-Phase Reaction and LA-Based Ligands.

In a glass vial, 100 µL of 15-20 µM stock solution (~1.5-2.0×nanomoles) of CdSe—ZnS QDs was precipitated with methanol or ethanol (two rounds) and mixed as a paste with 1.5 mL of methanol or 1-propanol containing LA-PEG (0.03-0.1M) and TMAH (~5 mM). A magnetic stirring bar was introduced, the vial was sealed with a rubber septum and the atmosphere was switched to Nitrogen by applying 3 to 4 round of mild vacuum followed by flushing with Nitrogen. The vial was then placed in the UV reactor (Model LZC-4V, Luzchem Research, Inc., Ottawa, Canada) and irradiated for 20 min ($\lambda_{irr}$ maximum peak at 350 nm, 4.5 mW/cm$^2$) with vigorous stirring, resulting in homogenous QD dispersion in the polar solvent. The solvent was removed under vacuum, followed by redispersion of the QDs in an ethanol/chloroform mixture. Then, hexane was slowly added (hexane:ethanol:chloroform=20:10:1) to precipitate out the QDs. Following centrifugation, the supernatant was removed, the content was mildly dried under vacuum for ~5 min., and buffer was added to disperse the QDs. This aqueous dispersion of QDs was filtered through 0.45 µm syringe filter and further purified by applying 1-2 rounds of concentration/dilution using a membrane filtration device Amicon Ultra 50,000 MW (from Millipore) to remove excess ligands and solubilized TOP/TOPO. The concentrated QDs were finally dispersed in DI water or buffers at a concentration of 5-10 µM (stock solution) and stored in the fridge at 4° C. for later use. We should note that shorter wavelength irradiation (at 300-313 nm) can be used. However, this UV range is overall less effective and it requires that materials be loaded into a quartz vial where light absorption by the cell walls is negligible compared to that exhibited by scintillation vials.
Transfer of QDs Using Two-Phase Reaction.

In a typical reaction, 100 µL of 15-20 µM stock solution (~1.5-2.0 nanomoles) of CdSe—ZnS QDs were precipitated with ethanol (two rounds), then dispersed in 750 µL of n-hexane (in a glass vial). 500 µL of methanol containing pure LA-PEG-OCH$_3$, or a mixture of LA-PEG-OCH$_3$ and LA-PEG-FN (~100 mM) and TMAH (10 mM) were added. A magnetic stirring bar was inserted, the vial was sealed with a rubber septum, and the atmosphere was switched to nitrogen by applying 3 to 4 rounds of mild vacuum followed by flushing with nitrogen. The vial was placed in the UV reactor, irradiated for 20 min, and then retrieved for further processing. Following irradiation, observation under white light showed that the top hexane layer became completely transparent (devout of QD material) while the bottom methanol layer became colored, indicating transfer of the QD material to methanol (see FIG. 2). When observed under hand held UV lamp, the fluorescence signal initially was limited to the hexane layer, but following photo-reduction the signal exclusively emanated from the methanol layer (see FIG. 2). The organic solvents (hexane and methanol) were removed under vacuum, and the QDs were transferred to buffer following the same steps (precipitation, centrifugation and purification using a filtration device) as described above. When the above procedure was applied to TOP/TOPO-QDs in the presence of LA-ZW, an additional benefit of the phase transfer can be realized. Though DHLA-ZW and LA-ZW were fully dispersible in methanol and DMF, DHLA-ZW-capped QDs were not. This produced precipitation of the DHLA-ZW-QDs while free ligands stayed dispersed in the solvent.

Transfer of QDs Using Pure Lipoic Acid can be carried using either route, with a slight modification. Following UV-irradiation, the slightly turbid dispersion of QDs in the polar phase (methanol) was centrifuged at 3500 rpm for 10 min, the solvents were removed under vacuum. Hexane was added to the precipitate, and mixture was centrifuged to remove the solubilized TOP/TOPO. Solvent decanted and water mixed with potassium-tert-butoxide (K-t-B, 1.5 equivalents with respect to the initial amount of LA ligand) was added, resulting in a clear QD sample. K-t-B is needed to shift the equilibrium of the medium to basic pH where the carboxy groups are deprotonated. See Reference 29.

Fluorescence Imaging of Brain Blood Capillaries of Live Animals.

Fluorescence images of the blood vasculature through a thinned skull window were acquired using an Olympus FluoView FV1000MPE multi-photon laser-scanning microscope. A mode-locked DeepSee Mai Tai Ti:sapphire laser (Mai Tai; Spectra-Physics) emitting at 840 nm was used for excitation; the excitation power at the sample was 15-40 mW. Fluorescence signal from the specimen was collected using a 20× water immersion objective (Olympus, N/A=1.00) and the photons within 575-630 nm range were selected via an Olympus filter set and detected by a Hamamatsu photomultiplier tube.

Materials.

All the PEGylated and zwitterionic ligand compounds were synthesized according to previously reported procedures. See References 54-56. The chemical compounds required for the synthesis: polyethylene glycol) (molecular weight average of 600 and 750), triphenylphosphine, thioctic acid, DMAP (4-(N,N-dimethylamino)pyridine), DCC (N,N-dicylohexylcarbodiimide), triethylamine, sodium borohydride, methanesulfonyl chloride, organic solvents (DMF, $CHCl_3$, etc.), PBS buffer, and salts (such as NaCl, $Na_2SO_4$, $Mg_2SO_4$), were purchased from Sigma Chemicals (St. Louis, Mo.). Sodium azide, N,N-dimethyl propanediamine, and 1,3-propane sultone were purchased from Alfa Aesar (Ward Hill, Mass.). Deuterated solvents were purchased from Cambridge Isotope Laboratories (Andover, Mass.). The chemicals and solvents were used as purchased unless otherwise specified.

Instrumentation.

The UV-irradiation experiments were performed using a UV photo-reactor Model LZC-4V (Luzchem Research Inc., Ottawa, Canada). It is equipped with fourteen lamps, one set of 6 lamps illuminating from the top and two sets of 4 lamps from the sides. The optical absorption and PL measurements were, respectively, carried out using an UV-vis absorption spectrophotometer (UV 2450 model from Shimadzu), and Fluorolog-3 spectrometer (HORIBA Jobin Yvon Inc., Edison, N.J.), equipped with a TBX PMT detector and an air cooled CCD camera. The $^1$H NMR spectra were collected using a 600 MHz spectrometer (Bruker SpectroSpin 600 MHz).

Gel Electrophoresis Experiment.

The gel electrophoresis experiments were carried out using QDs with mixed surface ligands (having varying fraction of either PEG-$NH_2$ or PEG-COOH mixed with PEG-$OCH_3$). A control dispersion made of QD capped with pure PEG-$OCH_3$ was used as control. All the QD dispersions in buffer were phase transferred using UV-irradiation. The QD dispersion were diluted in a 20% glycerol, 1×TBE (Tris borate EDTA), and loaded into 1% agarose gel media. The gel experiments were run at 7.5 V/cm using TBE (pH 8.3) as running buffer for ~20 min. The image was captured using Geldoc imager equipped with digital camera.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for preparing a composition comprising a polar solvent comprising a nanoparticle, the method comprising:
    irradiating a biphasic mixture, the biphasic mixture comprising a polar solvent and a non-polar solvent, the polar solvent and the non-polar solvent being immiscible in each other;
    wherein, prior to irradiation, the polar solvent comprises a hydrophilic surfactant, the hydrophilic surfactant comprising a moiety reactive with a surface of the nanoparticle or a moiety that becomes reactive with a surface of the nanoparticle during irradiation of the biphasic mixture;
    wherein, prior to irradiation, the non-polar solvent comprises the nanoparticle; and
    wherein irradiating the biphasic mixture induces a reaction between the nanoparticle and the reactive moiety of the hydrophilic surfactant, which reaction mediates transfer of the nanoparticle from the nonpolar solvent to the polar solvent.

2. The method of claim 1 wherein the nanoparticle comprises a core and a hydrophobic surfactant prior to irradiation of the biphasic mixture.

3. The method of claim 2 wherein the core comprises a nanocrystal.

4. The method of claim 2 wherein the core comprises a semiconductor nanocrystal.

5. The method of claim 2 wherein the core comprises a metal selected from the group consisting of gold, silver, platinum, copper, nickel, and alloys thereof.

6. The method of claim 2 wherein the core comprises a semiconductor selected from the group consisting of CdSe, CdS, CdSeS, CdTe, InAs, InP, GaAs, PbSe, PbS, HgSe, and HgTe.

7. The method of claim 2 wherein the core comprises a semiconductor selected from the group consisting of $AgInS_2$, $CuInS_2$, CdSeTe, ZnCdSe, and ZnCdTe.

8. The method of claim 2 wherein the core comprises a shell material selected from the group consisting of ZnS, ZnSe, CdS, ZnSeS, CdS, CdSZn.

9. The method of claim 2 wherein the hydrophobic surfactant is selected from the group consisting of a long alkyl chain phosphine, a long alkyl chain phosphine oxide, a long alkyl chain amine, a long alkyl chain carboxylic acid, a long alkenyl chain carboxylic acid, and a long chain alkenyl compound.

10. The method of claim 1 wherein the hydrophilic surfactant comprises the following general structure (I):

Structure (I)

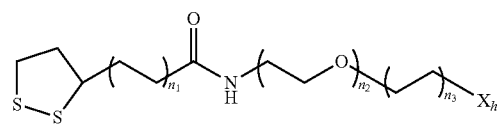

wherein:

$n_1$, $n_2$, and $n_3$ are each independently integers having a value between 1 and 20;

and $X_h$ comprises a functional group.

11. The method of claim 1 wherein the hydrophilic surfactant comprises the following structure (II):

Structure (II)

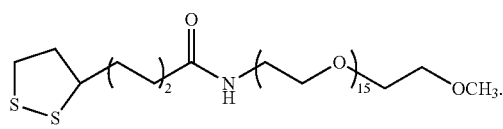

12. The method of claim 1 wherein the hydrophilic surfactant comprises the following structure (III):

Structure (III)

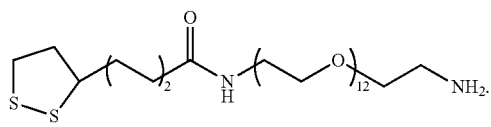

13. The method of claim 1 wherein the hydrophilic surfactant comprises the following structure (IV):

Structure (IV)

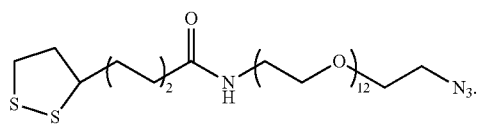

14. The method of claim 1 wherein the hydrophilic surfactant comprises the following structure (V):

Structure (V)

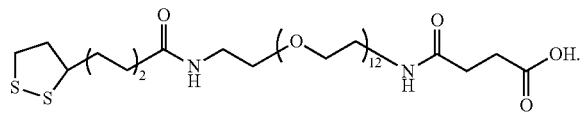

15. The method of claim 1 wherein the hydrophilic surfactant comprises the following general structure (VI):

Structure (VI)

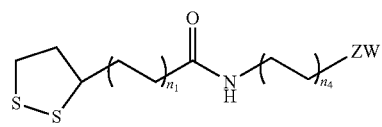

wherein:

$n_1$ has a value between 1 and 20;

$n_4$ has a value between 1 and 20; and

ZW is a zwitterionic moiety.

16. The method of claim 15 wherein the $n_4$ and the zwitterionic moiety combined has the following structure:

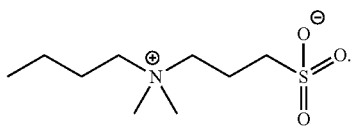

17. The method of claim 1 wherein the hydrophilic surfactant comprises the following structure (VI):

Structure (VII)

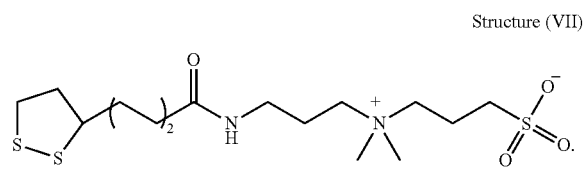

18. The method of claim 1 wherein the biphasic mixture is irradiated with UV light having a wavelength, $\lambda_{ex}$, between 250 nanometers and 400 nanometers.

* * * * *